US012631747B2

(12) United States Patent
Jumonji et al.

(10) Patent No.: US 12,631,747 B2
(45) Date of Patent: May 19, 2026

(54) DETERIORATION ASSESSMENT DEVICE, DETERIORATION ASSESSMENT METHOD, AND RECORDING MEDIUM

(71) Applicant: NEC Corporation, Tokyo (JP)

(72) Inventors: Nana Jumonji, Tokyo (JP); Kaori Iwafuchi, Tokyo (JP); Yosuke Kimura, Tokyo (JP); Chisato Sugawara, Tokyo (JP); Takakazu Ishii, Tokyo (JP); Daisuke Hashizume, Tokyo (JP); Hiromichi Hirata, Tokyo (JP); Shouhei Ohno, Tokyo (JP)

(73) Assignee: NEC CORPORATION, Tokyo (JP)

(*) Notice: Subject to any disclaimer, the term of this patent is extended or adjusted under 35 U.S.C. 154(b) by 175 days.

(21) Appl. No.: 18/038,341

(22) PCT Filed: Dec. 1, 2020

(86) PCT No.: PCT/JP2020/044578
§ 371 (c)(1),
(2) Date: May 23, 2023

(87) PCT Pub. No.: WO2022/118359
PCT Pub. Date: Jun. 9, 2022

(65) Prior Publication Data
US 2023/0417902 A1 Dec. 28, 2023

(51) Int. Cl.
*G01S 13/90* (2006.01)
*G01S 13/46* (2006.01)

(52) U.S. Cl.
CPC .............. *G01S 13/90* (2013.01); *G01S 13/46* (2013.01)

(58) Field of Classification Search
CPC ...... G01S 13/90; G01S 13/46; G01S 13/9023; G01B 15/06
See application file for complete search history.

(56) References Cited

U.S. PATENT DOCUMENTS

2009/0289837 A1* 11/2009 Nonaka ................... G06T 7/254
342/25 A
2016/0238704 A1* 8/2016 Schultz ............... G01S 13/9023

FOREIGN PATENT DOCUMENTS

JP 2008-039848 A 2/2008
JP 2016085145 A * 5/2016

OTHER PUBLICATIONS

Arnaud, Alain, Granda, Johanna, Banwell, Marie-Josée, and Javier Duro. "Reservoir Monitoring Using Radar Satellites." Paper presented at the Asia Pacific Oil and Gas Conference & Exhibition, Jakarta, Indonesia, Aug. 2009 (Year: 2009).*
Giardina et. al. Evaluation of InSAR monitoring data for post-tunnelling settlement damage assessment, Structural Control and Health Monitoring vol. 26, Issue 2, 2018 (Year: 2018).*
(Continued)

*Primary Examiner* — Robert W Hodge
*Assistant Examiner* — Bongani Jabulani Mashele
(74) *Attorney, Agent, or Firm* — Sughrue Mion, PLLC

(57) ABSTRACT
A deterioration assessment device includes: a memory; and at least one processor coupled to the memory. The processor performs operations. The operations include: acquiring information on displacement of a ground surface; extracting a position at which sensor information used for assessment of deterioration is acquired based on the information on the displacement of the ground surface; and outputting the extracted position.

15 Claims, 10 Drawing Sheets

(56)                    References Cited

OTHER PUBLICATIONS

JP Office Action for JP Application No. 2022-566514, mailed on May 14, 2024 with English Translation.

Masaki Mizuno, "Investigation of the field situation using SAR satellite images for the emergency response following landslide disasters", Niigata University, May 12, 2016, pp. 71-81, 98, <URL: https://niigata-u.repo.nil.ac.jp/records/5791>.

Takako Kashiwase et al., "Evaluation Method for the Earthquake Resistant Performance of RC Buildings—Flexural and Shear Experiments on RC Member to Investigate Crack Width—", Report of Obayashi Corporation Technology Research Institute, 2003, No. 67, pp. 1-6, <URL: https://www.obayashi.co.jp/technology/shoho/067/2003_067_14.pdf>.

International Search Report for PCT Application No. PCT/JP2020/044578, mailed on Feb. 2, 2021.

English translation of Written opinion for PCT Application No. PCT/JP2020/044578, mailed on Feb. 2, 2021.

North, M. et al., "Monitoring the Response of Roads and Railways to Seasonal Soil Movement with Presistent Scatterers Interferometry over Six UK Sites" Remote Sensing, vol. 9, No. 9, Sep. 4, 2017, Article 922, 17 Pages.

Kimura, T. et al., "Satellite Imagery Analysis for Detecting Slope and Ground Deformations in Area Affected by the 2016 Kumamoto Earthquake", Technical Note of the National Research Institute for Earth Science and Disaster Resilience [online], Sep. 29, 2017, No. 412, pp. 34 to 36.

* cited by examiner

Fig. 3

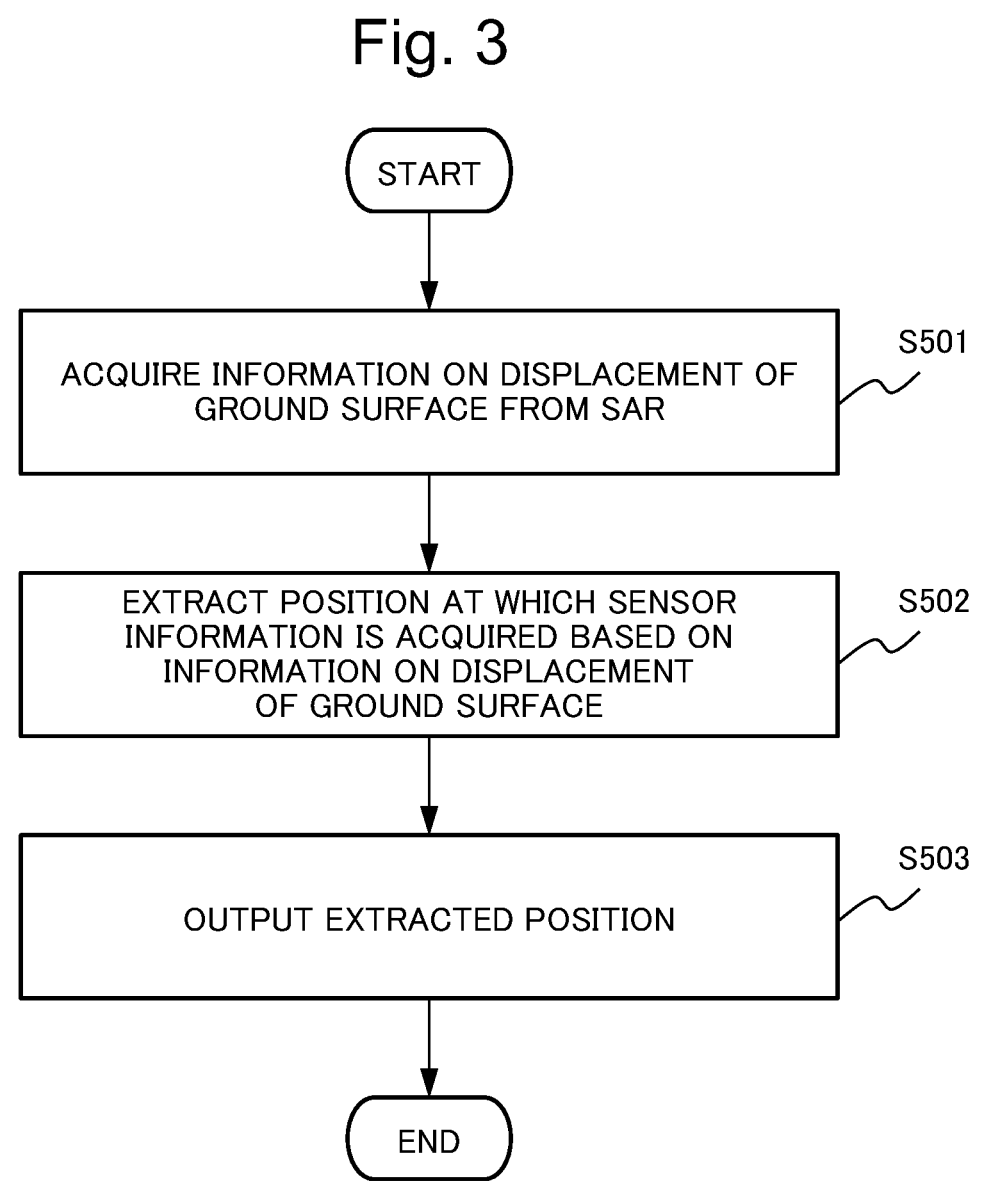

```
        ┌─────────┐
        │  START  │
        └─────────┘
             │
             ▼
┌───────────────────────────────────┐
│   ACQUIRE INFORMATION ON           │      S501
│   DISPLACEMENT OF                  │
│   GROUND SURFACE FROM SAR          │
└───────────────────────────────────┘
             │
             ▼
┌───────────────────────────────────┐
│   EXTRACT POSITION AT WHICH SENSOR │      S502
│   INFORMATION IS ACQUIRED BASED ON │
│   INFORMATION ON DISPLACEMENT      │
│   OF GROUND SURFACE                │
└───────────────────────────────────┘
             │
             ▼
┌───────────────────────────────────┐
│   OUTPUT EXTRACTED POSITION        │      S503
└───────────────────────────────────┘
             │
             ▼
        ┌─────────┐
        │   END   │
        └─────────┘
```

RANGE IN WHICH SENSOR
INFORMATION IS ACQUIRED

REGION IN WHICH GROUND
SINKING IS LARGE

Fig. 6

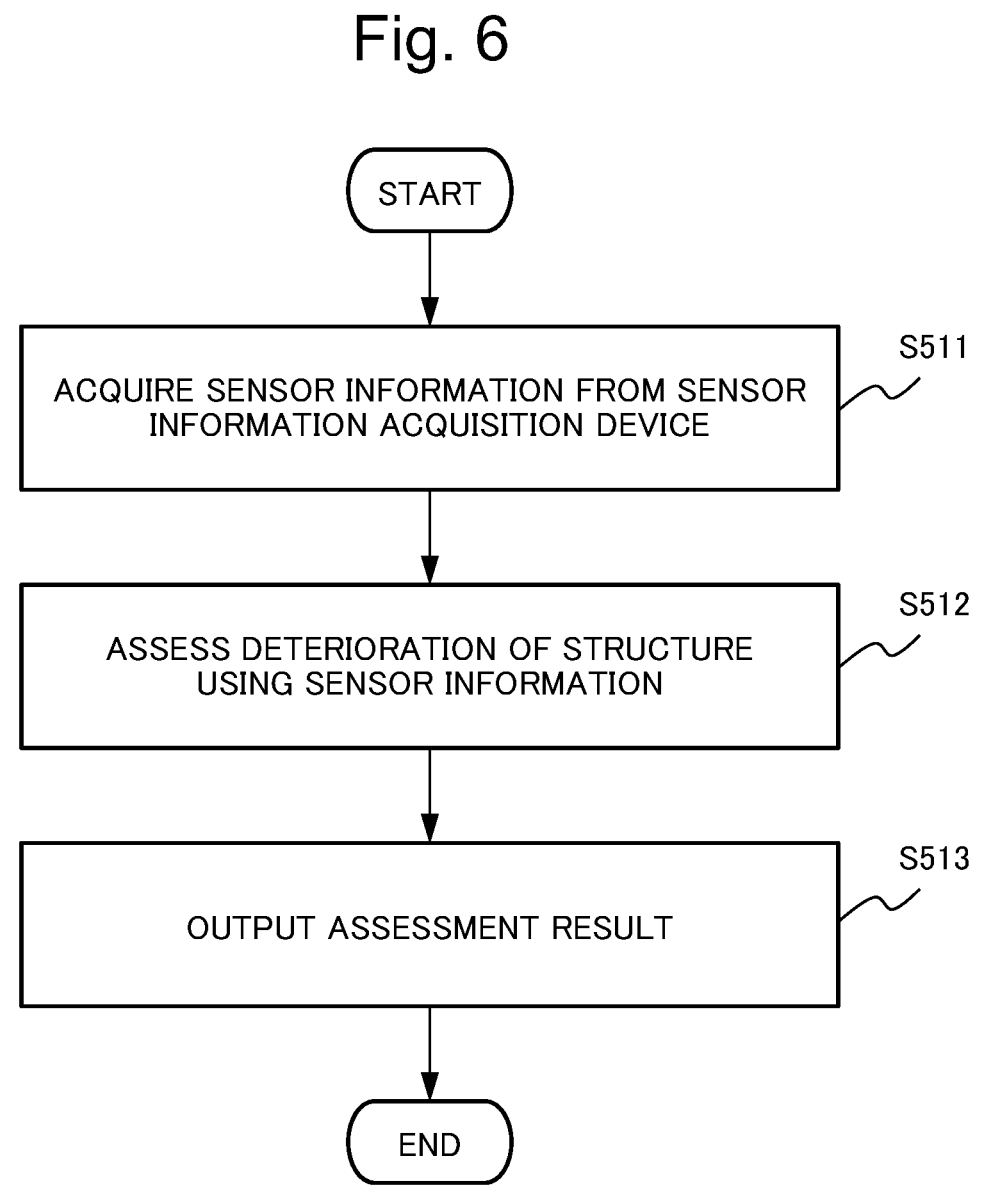

```
        ┌─────────┐
        │  START  │
        └─────────┘
             │
             ▼
┌───────────────────────────────────────┐      S511
│  ACQUIRE SENSOR INFORMATION FROM SENSOR│
│     INFORMATION ACQUISITION DEVICE     │
└───────────────────────────────────────┘
             │
             ▼
┌───────────────────────────────────────┐      S512
│     ASSESS DETERIORATION OF STRUCTURE  │
│        USING SENSOR INFORMATION        │
└───────────────────────────────────────┘
             │
             ▼
┌───────────────────────────────────────┐      S513
│         OUTPUT ASSESSMENT RESULT       │
└───────────────────────────────────────┘
             │
             ▼
        ┌─────────┐
        │   END   │
        └─────────┘
```

RANGE IN WHICH SENSOR
INFORMATION IS ACQUIRED

REGION IN WHICH GROUND
SINKING IS LARGE

● : POSITION AT WHICH DETERIORATION IS DETECTED

❗ : POSITION AT WHICH DETERIORATION IS LARGE

✖ : POSITION AT WHICH DETERIORATION IS LARGE
   AT BOUNDARY

Figure 9:
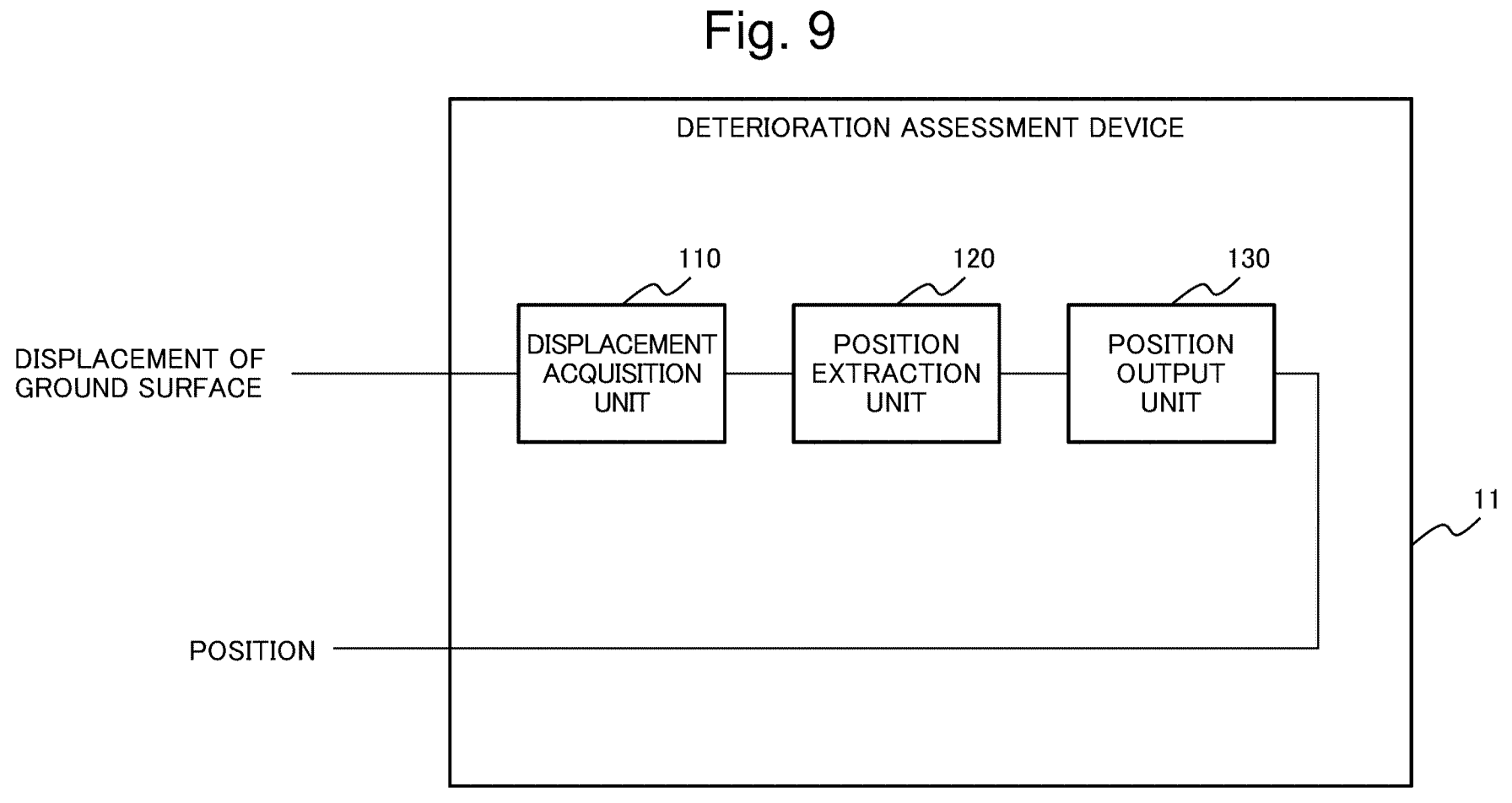

DETERIORATION ASSESSMENT DEVICE

DISPLACEMENT OF GROUND SURFACE

110
DISPLACEMENT ACQUISITION UNIT

120
POSITION EXTRACTION UNIT

130
POSITION OUTPUT UNIT

POSITION

Fig. 10

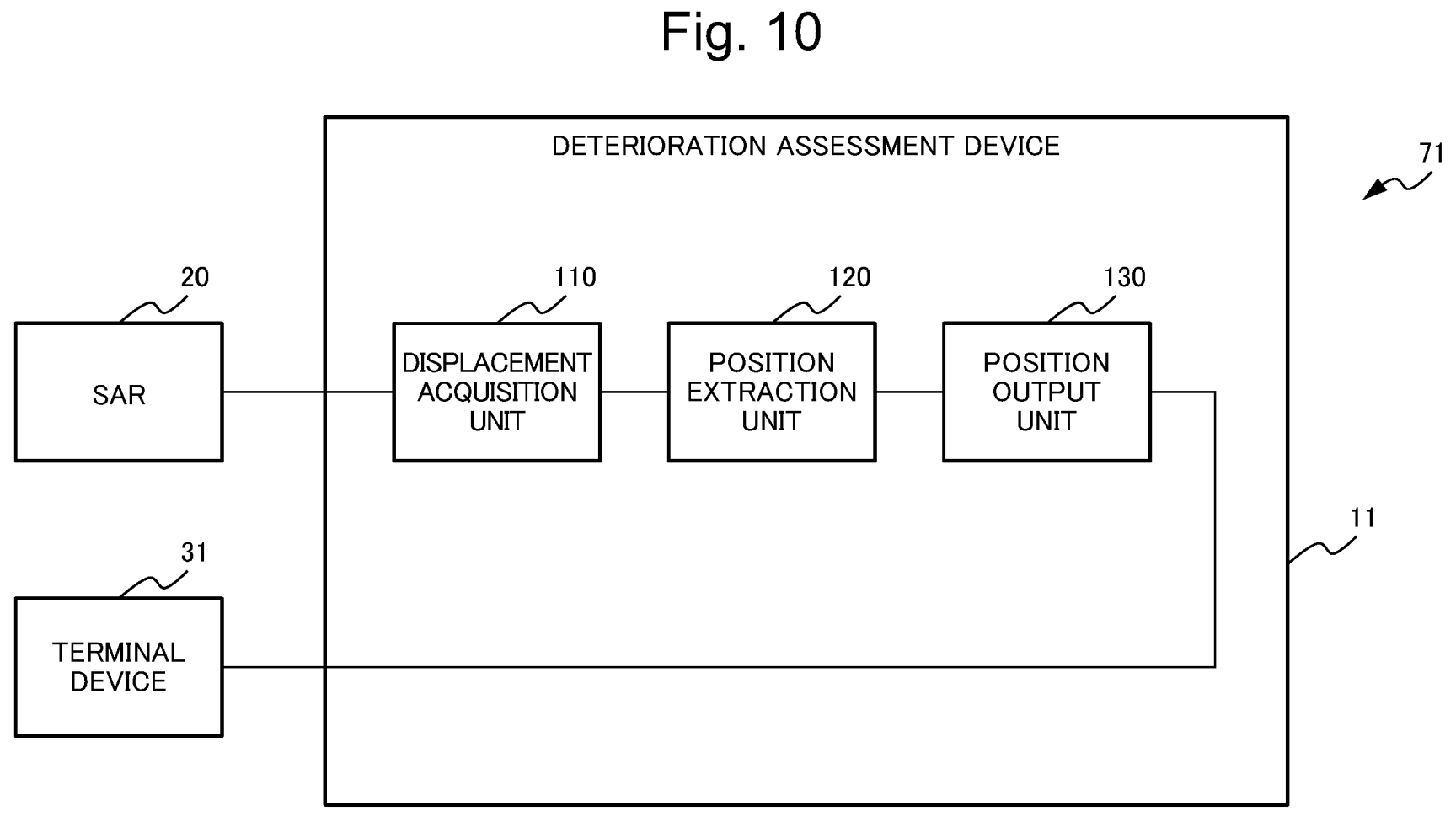

DETERIORATION ASSESSMENT DEVICE    11

71

110 — DISPLACEMENT ACQUISITION UNIT

120 — POSITION EXTRACTION UNIT

130 — POSITION OUTPUT UNIT

20 — SAR

31 — TERMINAL DEVICE

Fig. 11

DETERIORATION ASSESSMENT DEVICE, DETERIORATION ASSESSMENT METHOD, AND RECORDING MEDIUM

This application is a National Stage Entry of PCT/JP2020/ 044578 filed on Dec. 1, 2020, the contents of all of which are incorporated herein by reference, in their entirety.

TECHNICAL FIELD

The present invention relates to assessment of deterioration of a structure.

BACKGROUND ART

As a technique for measuring a structure on the ground, a technique for measuring a state of a ground surface using "Synthetic Aperture Radar (SAR)" is known (See, for example, PTL 1).

A map information update supporting device (hereinafter, referred to as a "device of PTL 1") described in PTL 1 is a device that can efficiently update map information using a radar device (SAR) in order to solve the issue of creating a map using an optical image.

Specifically, the device of PTL 1 calculates a characteristic value of each piece of time-series image data of an observation range acquired by the radar device at different times. Then, the device of PTL 1 extracts a change area of a feature (vegetation and a construction of ground surface, or the like) based on the calculated characteristic value. Then, the device of PTL 1 synthesizes the feature change area and the map information. Then, the device of PTL 1 outputs the map information including the feature change area as a search point when updating the map.

As described above, the device of PTL 1 extracts the change area of the feature using the radar device as the information for updating a map, and outputs the change area of the feature together with the map information.

CITATION LIST

Patent Literature

PTL 1: JP 2008-039848 A

SUMMARY OF INVENTION

Technical Problem

Structures constituting a social infrastructure such as roads and airports have a large influence on society when they become unusable. However, the structure deteriorates over time. Therefore, a management entity (for example, a country, a local government, or an operating company) of a structure checks a state of deterioration of the structure, and performs repair or the like before the structure deteriorates and becomes unusable.

As a technique for assessing deterioration of a structure, there is known a technique for assessing displacement (depression or protrusion) of a ground surface serving as a base of the structure using SAR.

However, a spatial resolution of the displacement of the ground surface using the SAR is about several meters even with a relatively high spatial resolution SAR.

Meanwhile, for example, a magnitude of deterioration (cracks, pot holes, or the like) affecting traveling on a road surface is smaller than the spatial resolution of the SAR.

As described above, when deterioration of a structure is assessed using SAR, there is an issue that detailed deterioration of a structure such as a crack of a road surface cannot be assessed.

Therefore, it is desired to provide information for assessing deterioration in more detail in deterioration assessment of a structure.

An object of the present invention is to solve the above issue and to provide a deterioration assessment device and the like that output information for assessing deterioration in more detail in deterioration assessment of a structure.

Solution to Problem

According to an aspect of the present invention, there is provided a deterioration assessment device includes:

a memory; and at least one processor coupled to the memory.

The processor performs operations. The operations include:

acquiring information on displacement of a ground surface;

extracting a position at which sensor information used for assessment of deterioration is acquired based on the information on the displacement of the ground surface; and outputting the extracted position.

According to an aspect of the present invention, there is provided a deterioration assessment system includes:

the above deterioration assessment device;

a synthetic aperture radar that outputs the information on the displacement of the ground surface to the deterioration assessment device; and a terminal device that acquires the position from the deterioration assessment device and outputs the position.

According to an aspect of the present invention, there is provided a deterioration assessment method includes:

acquiring information on displacement of a ground surface;

extracting a position at which sensor information used for assessment of deterioration is acquired based on the information on the displacement of the ground surface; and outputting the extracted position.

According to an aspect of the present invention, there is provided a deterioration assessment method includes:

executing the above method by a deterioration assessment device;

outputting information on the displacement of the ground surface to the deterioration assessment device by a synthetic aperture radar; and acquiring the position from the deterioration assessment device and outputting the acquired position by a terminal device.

According to an aspect of the present invention, there is provided a non-transitory computer-readable recording medium embodying a program for causing a computer to perform a method. The method includes:

acquiring information on displacement of a ground surface;

extracting a position at which sensor information used for assessment of deterioration is acquired based on the information on the displacement of the ground surface; and outputting the extracted position.

Advantageous Effects of Invention

According to the present invention, it is possible to provide information for assessing deterioration in more detail in deterioration assessment of a structure.

BRIEF DESCRIPTION OF DRAWINGS

FIG. 3 is a flowchart illustrating an example of an operation of outputting a position at which sensor information is acquired in the deterioration assessment device according to the first example embodiment.

FIG. 6 is a flowchart illustrating an example of an operation of assessing deterioration in the deterioration assessment device according to the first example embodiment.

FIG. 9 is a block diagram illustrating an example of a configuration of a deterioration assessment device according to a second example embodiment.

FIG. 10 is a block diagram illustrating an example of a configuration of a deterioration assessment system including the deterioration assessment device according to the second example embodiment.

FIG. 11 is a block diagram illustrating an example of a hardware configuration of a deterioration assessment device.

EXAMPLE EMBODIMENT

Figure 1:
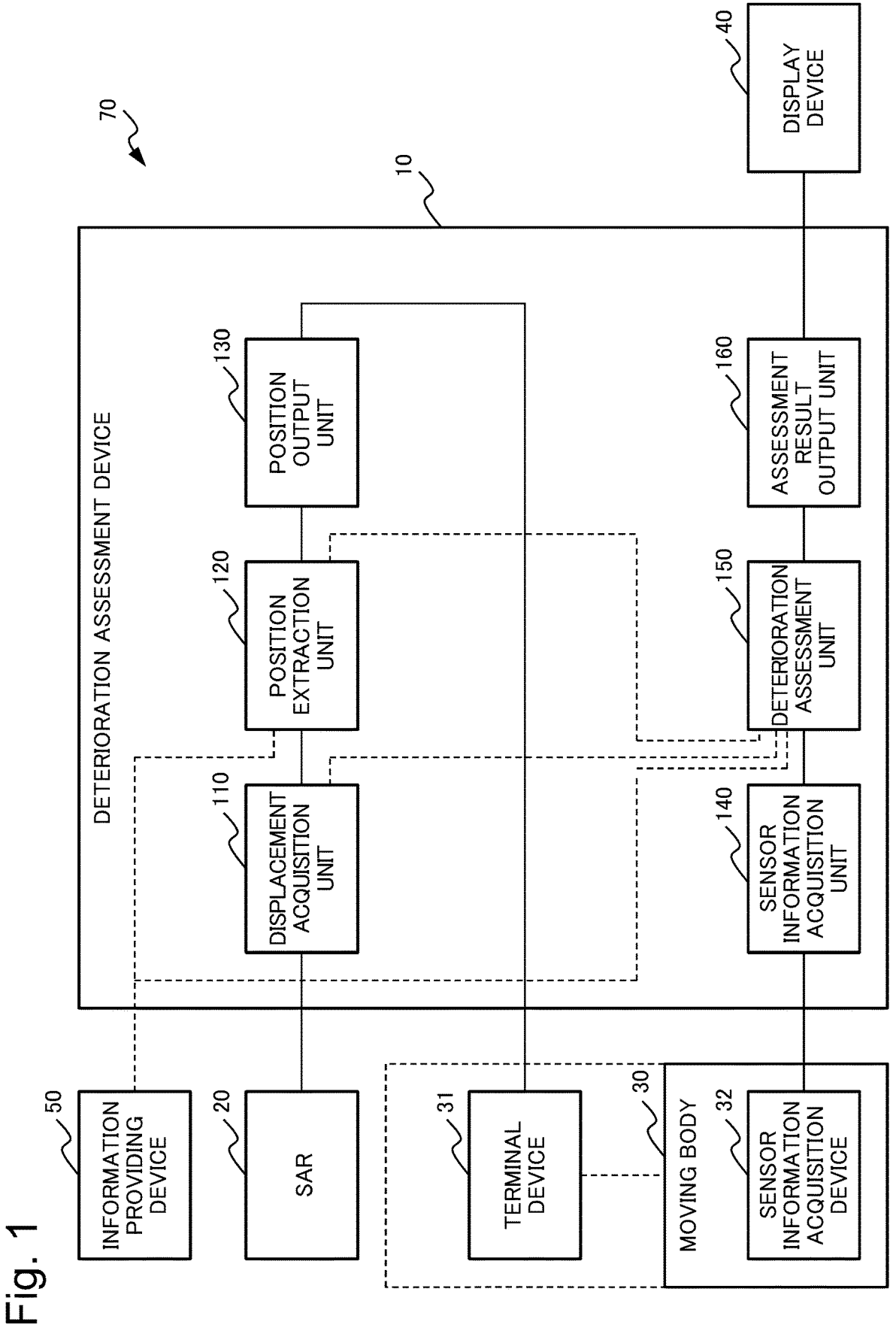
FIG. 1 is a block diagram illustrating an example of a configuration of a deterioration assessment system including a deterioration assessment device according to a first example embodiment.

Next, example embodiments of the present invention will be described with reference to the drawings.

Each drawing is for describing example embodiments of the present invention. However, the example embodiment of the present invention is not limited to the description of each drawing. Similar configurations in the drawings are denoted by the same reference numerals, and repeated description thereof may be omitted. In the drawings used in the following description, in the description of the example embodiments of the present invention, the description of portions not related to the solution of the issue of the present invention may be omitted and not illustrated.

Terms

First, terms used for description of each example embodiment will be described.

A "Synthetic Aperture Radar (hereinafter, "SAR")" is a radar that transmits and receives radio waves while a flying object (such as an artificial satellite or an airplane) is moving, and obtains an image equivalent to that in the case of an antenna having a large opening.

A resolution in radar observation is improved as a size of an antenna increases. However, a size of an antenna that can be mounted on an artificial satellite or the like is limited. Therefore, the SAR uses an antenna having a small actual aperture length to transmit and receive (that is, by artificially "synthesizing" an "opening") radio waves while flying, thereby improving resolution in the traveling direction (that is, a virtually large antenna is configured.).

An "interference SAR" is a technology in which two observations using SAR are performed on the same place on a ground surface, and a difference (for example, in the case of the ground surface, displacement (sinking or protrusion) of the ground surface) in distance to the place between two observations is measured from a difference in "phase" of two reflected waves.

A sign of the displacement of the ground surface may be any sign. A sign when sinking increases may be positive. Alternatively, a sign in a case where the protrusion increases may be positive. Alternatively, the displacement may be an absolute value.

Specifically, the interference SAR measures displacement of a distance to a structure on the ground (ground supporting a foundation of a structure) as the displacement. However, in general, deformation of the structure is smaller than a change in the ground. The interference SAR uses a noise removal technique based on various factors. Therefore, each example embodiment operates by regarding the displacement of the distance measured using the interference SAR as the displacement of the surface (that is, the ground surface) of the ground on which the structure is based.

A "ground surface displacement speed" is a degree of change (for example, mm/year) in displacement (sinking or protrusion) of the ground surface with respect to time. In the following description, it is assumed that a sign of the ground surface displacement speed is positive in a direction in which a sinking speed increases. However, the sign of the ground surface displacement speed may be positive in a direction in which a speed of the protrusion increases. Alternatively, the ground surface displacement speed may be an absolute value.

As a technique for assessing deterioration of a structure, in addition to a technique using SAR, a technique for assessing deterioration of a road surface such as a road using sensor information (for example, an image and/or acceleration) acquired by a sensor (for example, a drive recorder) mounted on a vehicle is known.

Next, terms related to a technique using a sensor mounted on or towed by a vehicle or the like will be described.

The "sensor information" is information acquired using a predetermined sensor in order to assess deterioration in a portion which becomes an assessment target in a structure (for example, a road, a bridge, a platform, an embankment, a pier, a seawall, or a runway). In each example embodiment, information (for example, an image or acceleration) related to a structure acquired by a sensor information acquisition device (for example, a drive recorder or an accelerometer) mounted on or towed by a moving body (for example, a four-wheeled vehicle, a two-wheeled vehicle, a drone, or a person) is used as the sensor information. For example, the sensor information is an acceleration detected by an accelerometer of a drive recorder mounted on a vehicle that has traveled a structure that is the assessment target of the deterioration, or an image captured by the drive recorder.

In the following description, a drive recorder and an image are used as examples of the sensor information acquisition device and the sensor information.

A spatial resolution of the displacement of the ground surface using SAR is about several meters to several tens of meters. Meanwhile, a spatial resolution of the deterioration assessment using the sensor information is about several centimeters to several meters. As described above, the spatial resolution of the deterioration assessment using the sensor information is higher than the spatial resolution of the displacement of the ground surface. Therefore, the deterioration assessment using the sensor information can assess the deterioration in more detail than the assessment using the displacement of the ground surface.

A "deterioration degree" is a deterioration degree in a portion which becomes the assessment target in the structure, which is assessed using the sensor information.

In each example embodiment, the expression form of the deterioration degree may be any form. For example, a numerical value may be used as the deterioration degree. Alternatively, a value other than a numerical value may be used as the deterioration degree. For example, characters such as {large, small} or {large, medium, small} may be used as the deterioration degree.

When a value is used as the deterioration degree, a range of the value of the deterioration degree may be any range.

For example, when a "crack rate" of the road surface is used as the deterioration degree, the value of the deterioration degree is in a range of 0.0 to 1.0 (0% to 100%).

The crack rate is a value obtained by dividing an area of a crack by an area of an investigation target section.

Alternatively, when an "amount of rustle" is used as the deterioration degree, the value of the deterioration degree is generally an integer (the unit is mm) equal to or more than 0. A rational number may be used as the value of the amount of rustle.

The amount of rustle is a height from a rutting portion to a convex portion in a predetermined range (for example, 20 m).

Alternatively, when "International Roughness Index (IRI)" is used as the deterioration degree, the value of the deterioration degree is a rational number (the unit is mm/m or m/km) equal to or more than 0 or more.

IRI is an evaluation index for unevenness of a paved road proposed by the World Bank in 1986.

Even when "Boeing Bump Index (BBI)" is used as the deterioration degree, the value of the deterioration degree is a rational number (the unit is dimensionless) equal to or more than 0 or more.

BBI is a flatness index adopted by the United Nations Aviation Administration in 2009.

As described above, the range of the value of the deterioration degree may be any range. A user of each example embodiment may appropriately select the deterioration degree related to the deterioration in the structure which is the assessment target.

In the following description, the "crack rate" will be used as an example of the deterioration degree. Therefore, in the following description, when the deterioration degree deteriorates, the value of the deterioration degree increases. However, as the value of the deterioration degree, a value in which the value decreases when the deterioration degree is degraded may be used in relation to processing using the deterioration degree.

A "deterioration speed" is a degree of change in the deterioration degree with respect to time.

In each example embodiment, the deterioration speed may be temporally constant or may change. The user may select a type of deterioration speed according to the assessment target. For example, linear approximation such as linear regression may be used as the deterioration speed. Alternatively, a quadratic curve (quadratic regression) may be used as the deterioration speed.

Further, each example embodiment may use a deterioration degree related to a plurality of deteriorations as a diagnosis result of the deterioration. For example, in each example embodiment, when the deterioration is a crack generated in the structure and a rustle, the deterioration degree is, for example, the crack rate and the amount of rustle. In this case, each example embodiment may use each deterioration speed in addition to the deterioration degree for each deterioration.

In the following description, a case where one deterioration degree (as described above, the crack rate) is used will be described for clarity of description.

A "surface layer" of the structure is a portion including a range where the deterioration can be checked from the outside of the structure, for example, a surface and a predetermined range close to the surface. For example, the surface layer of the structure is a portion including a surface and a range from the surface to a predetermined depth. Alternatively, the surface layer of the structure is a configuration (for example, in the case of a paved road, a surface layer in contact with a tire of a vehicle) in contact with another object in the structure.

In the following description, a portion excluding the surface layer of the structure is referred to as a "deep layer".

First Example Embodiment

Hereinafter, a first example embodiment will be described with reference to the drawings.
[Description of Configuration]

First, a configuration of a deterioration assessment device 10 according to the first example embodiment will be described with reference to the drawings.

FIG. 1 is a block diagram illustrating an example of a configuration of a deterioration assessment system 70 including the deterioration assessment device 10 according to the first example embodiment.

The deterioration assessment system 70 includes the deterioration assessment device 10, a SAR 20, a moving body 30, a terminal device 31, a sensor information acquisition device 32, a display device 40, and an information providing device 50. The deterioration assessment system 70 may include a plurality of at least any configurations instead of one. For example, the deterioration assessment system 70 may include a plurality of the moving bodies 30, a plurality of the terminal devices 31, and a plurality of the sensor information acquisition devices 32. In this case, the number of moving bodies 30, the number of terminal devices 31, and the number of sensor information acquisition devices 32 may be the same or different. For example, the moving body 30 may be mounted with the plurality of sensor information acquisition devices 32.

The devices included in the deterioration assessment system 70 are connected via a predetermined communication path (for example, the Internet or a public telephone line). The communication path may be wired, wireless, or a combination of wired and wireless.

The SAR 20 is a device or system that uses SAR (interference SAR) to observe a predetermined range including the structure that is the assessment target, and analyzes an observation result (for example, SAR image) to assess displacement of the ground surface. Then, the SAR 20 outputs the assessment result (information on the displacement of the ground surface) to the deterioration assessment device 10. The assessment result (information on the displacement of the ground surface) includes a position of the displacement in addition to the displacement of the ground surface.

The moving body 30 is mounted with or tows the sensor information acquisition device 32 so that the sensor information acquisition device 32 acquires the sensor information at a position at which the sensor information acquisition device acquires sensor information.

The moving body 30 may be any one as long as it can move the sensor information acquisition device 32 to a position at which the sensor information is acquired. For example, the moving body 30 may be a vehicle (four-wheeled vehicle or two-wheeled vehicle) or a drone (unmanned aerial vehicle). Alternatively, a person may carry the sensor information acquisition device 32 as the moving body 30.

For example, in a case where the moving body 30 is a vehicle mounted with the sensor information acquisition device 32, a driver of the vehicle may operate (drive) the vehicle to travel at a position at which the sensor information is acquired. Alternatively, in a case where the moving body 30 is a person, the person may carry the sensor information acquisition device 32 to a position at which the sensor information is acquired.

In a case where the moving body 30 is transportation equipment such as a vehicle or a drone, the moving body 30 is not limited to transportation equipment operated by a person. For example, the moving body 30 may be an automatic driving vehicle or a drone.

The terminal device 31 acquires a position at which the sensor information is acquired from the deterioration assessment device 10 using the sensor information acquisition device 32. Then, the terminal device 31 outputs the acquired position.

A place where the terminal device 31 is installed may be any place.

For example, the terminal device 31 may be mounted on the moving body 30. For example, in a case where the moving body 30 is a vehicle, the terminal device 31 may be a navigation device mounted on the vehicle. In this case, for example, the navigation device outputs the acquired position on the map. Then, the driver of the vehicle may operate the vehicle so as to travel at the position output by the navigation device.

In a case where the terminal device 31 is the navigation device, the terminal device 31 may output a route from a current position or a predetermined position to the acquired position. For example, the terminal device 31 may output a route from the current position to the acquired position by superimposing the route on a map. Furthermore, in a case where a plurality of positions is acquired, the terminal device 31 may output a route passing through the plurality of positions.

In a case where the moving body 30 is a vehicle and the structure is a road with a center line, the number of lanes on which the vehicle can travel is half for each traveling direction. Therefore, the terminal device 31 may assess a lane in which the sensor information is acquired based on the position output by the deterioration assessment device 10, and output a route on which the vehicle can travel in the assessed lane. Alternatively, the terminal device 31 may output a route for traveling in both lanes. Alternatively, in a case where there is a plurality of lanes in the same direction, the terminal device 31 may output a route for traveling on each lane in the same direction.

Alternatively, the terminal device 31 may be installed at a place different from the moving body 30. For example, the terminal device 31 may be a device (for example, a display) included in a system of an organization (for example, a local government) that manages a structure. In this case, a person in charge of the organization may notify the driver of the moving body 30 of the position displayed on the display.

Alternatively, the terminal device 31 may be a device (for example, a smartphone) carried by a driver of the moving body 30. In this case, the terminal device 31 may display the position in cooperation with a predetermined map application.

A display format in the terminal device 31 may be any format. The user of the deterioration assessment system 70 may appropriately select the display format according to a movement mechanism of the moving body 30 and an acquisition method of the sensor information in the sensor information acquisition device 32.

The sensor information acquisition device 32 is mounted on or towed by the moving body 30 (for example, a vehicle) and moved. Then, the sensor information acquisition device 32 acquires sensor information (for example, an image and/or an acceleration) related to a structure (for example, a road, a bridge, a platform, an embankment, a pier, a seawall, or a runway) which becomes the assessment target.

For example, the sensor information acquisition device 32 may be a drive recorder mounted on a vehicle. In this case, the sensor information is, for example, an image of a road surface (for example, images of the road surface in front of, behind, on the side of, and/or in all directions of the vehicle.).

However, the sensor information is not limited to an image. For example, the sensor information acquisition device 32 may acquire the acceleration of the moving body 30 as the sensor information. In this case, the moving body 30 may be mounted with an accelerometer as the sensor information acquisition device 32.

Then, the sensor information acquisition device 32 outputs the acquired sensor information to the deterioration assessment device 10.

The sensor information acquisition device 32 may include the terminal device 31. Alternatively, the terminal device 31 may include the sensor information acquisition device 32.

The display device 40 includes a display device such as a liquid crystal display, and displays an assessment result acquired from the deterioration assessment device 10. The deterioration assessment system 70 may use any device as the display device 40. For example, the display device 40 may be a display included in a local government system that manages roads. Alternatively, the display device 40 may be a device (for example, a smartphone) carried by the user who checks the deterioration of the structure.

The terminal device 31 and the display device 40 may be the same device.

A display format in the display device 40 may be any format. The user of the deterioration assessment system 70 may appropriately select the display format according to the purpose of use of the display.

The information providing device 50 outputs predetermined information to the deterioration assessment device 10. The information output from the information providing device 50 will be further described later.

The deterioration assessment device 10 acquires information on the displacement of the ground surface from the SAR 20. Then, the deterioration assessment device 10 extracts the position at which the sensor information used for assessing deterioration of the structure is acquired based on the information on the displacement of the ground surface. Then, the deterioration assessment device 10 outputs the extracted position to a predetermined device (for example, the terminal device 31).

The deterioration assessment device 10 may store the extracted position in a predetermined storage device. In this case, the terminal device 31 may acquire the position stored in the storage device. For example, the user of the terminal device 31 may operate the terminal device 31 to acquire the position stored in the storage device.

Further, the deterioration assessment device 10 acquires the sensor information related to the position at which the sensor information is acquired from the sensor information acquisition device 32. Then, the deterioration assessment device 10 assesses the deterioration of the structure using the acquired sensor information. Then, the deterioration assessment device 10 outputs the assessment result of the deterioration to a predetermined device (for example, the display device 40).

The deterioration assessment device 10 may store the assessment result in a predetermined storage device. In this case, the display device may acquire the assessment result stored in the storage device. For example, the user of the display device 40 may operate the display device to acquire the assessment result stored in the storage device.

The deterioration assessment device 10 may output the assessment result to the terminal device 31.

Figure 2:
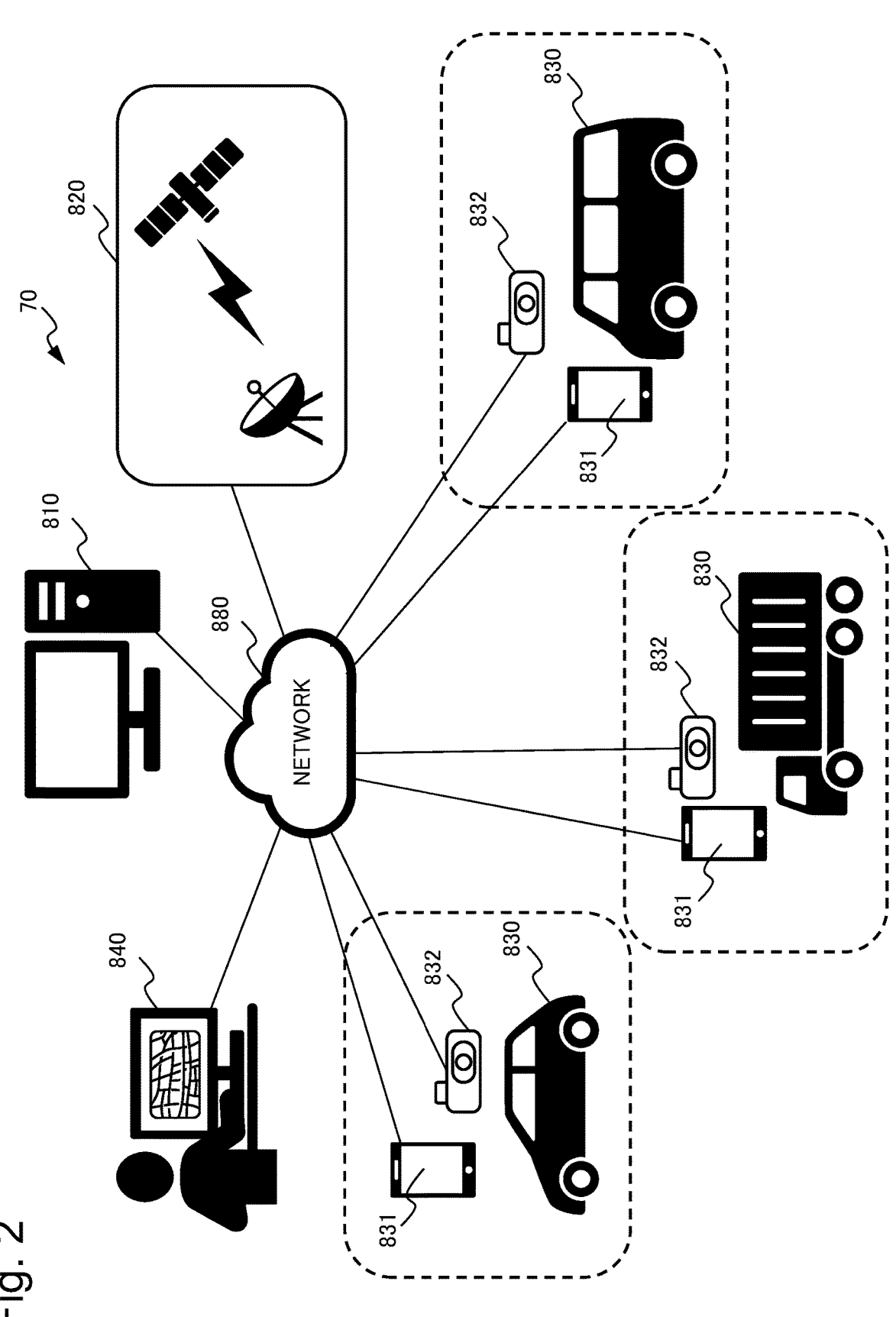
FIG. 2 is a conceptual diagram illustrating an example of the configuration of the deterioration assessment system according to the first example embodiment.

FIG. 2 is a conceptual diagram illustrating an example of the configuration of the deterioration assessment system 70.

The deterioration assessment system 70 in FIG. 2 includes a computer 810 as an example of the deterioration assessment device 10, a SAR system 820 including an artificial satellite and a ground station as an example of the SAR 20, a vehicle 830 as an example of the moving body 30, and a display system 840 as an example of the display device 40. The deterioration assessment system 70 further includes a tablet 831 as an example of the terminal device 31 and a drive recorder 832 as an example of the sensor information acquisition device 32. The deterioration assessment system 70 further includes a network 880 as a communication path for connecting each device and system.

The network 880 is a communication path that connects devices and systems to each other. The network 880 is not particularly limited as long as each device and system can be connected. For example, the network 880 may be the Internet, a public telephone line, or a combination thereof.

The SAR system 820 outputs, to the computer 810, information (for example, the displacement of the ground surface and the position) on the displacement of the ground surface assessed based on the SAR image acquired using the satellite.

The computer 810 extracts the position at which the sensor information used for assessing deterioration of the structure (for example, a road) is acquired based on the acquired information on the displacement of the ground surface. Then, the computer 810 outputs the extracted position to the tablet 831.

The tablet 831 displays the position acquired from the computer 810.

The vehicle 830 is mounted with the tablet 831 and the drive recorder 832. In FIG. 2, the tablet 831 and the drive recorder 832 are displayed outside the vehicle 830 for easy understanding.

Then, the driver of the vehicle 830 operates the vehicle 830 to travel at the position (for example, a road) displayed on the tablet 831.

The drive recorder 832 acquires sensor information (for example, image and acceleration) on the road at the position acquired by the tablet 831. Then, the drive recorder 832 outputs the acquired sensor information to the computer 810.

The computer 810 assesses the deterioration of the structure (for example, a road) using the sensor information acquired from the drive recorder 832. Then, the computer 810 outputs the assessment result to the display system 840.

The display system 840 displays the acquired assessment result on a predetermined device (for example, a liquid crystal display).

The computer 810, the SAR system 820, the vehicle 830, the tablet 831, the drive recorder 832, and the display system 840 included in the deterioration assessment system 70 are not particularly limited. As the computer 810, the SAR system 820, the vehicle 830, the tablet 831, the drive recorder 832, and the display system 840, generally available products and systems may be used. Therefore, a detailed description thereof will be omitted.

The description returns to the description with reference to FIG. 1.

The sensor information acquisition device 32 may output the sensor information to the deterioration assessment device 10 not directly but indirectly. For example, the sensor information acquisition device 32 may store the sensor information in a removable storage device (for example, Universal Serial Bus (USB) memory). Then, the user may output the sensor information stored in the removable storage device (for example, a USB memory) to the deterioration assessment device 10 using a reading device connected to the deterioration assessment device 10.

The deterioration assessment device 10 may be mounted on the moving body 30.

Next, a configuration of the deterioration assessment device 10 will be described.

The deterioration assessment device 10 includes a displacement acquisition unit 110, a position extraction unit 120, a position output unit 130, a sensor information acquisition unit 140, a deterioration assessment unit 150, and an assessment result output unit 160. Each configuration may store the acquired information and/or the generated information in a storage unit (not illustrated). In this case, each configuration may acquire necessary information from the storage unit. In the following description, an operation in a case where the storage unit is not used will be described for convenience of description.

The displacement acquisition unit 110 acquires, from the SAR 20, information (for example, the displacement of the ground surface and the position of the displacement) on the displacement of the ground surface including the structure which is the assessment target. A timing at which displacement acquisition unit 110 acquires the information on the displacement of the ground surface may be any timing. The displacement acquisition unit 110 may acquire the information on the displacement of the ground surface periodically (for example, the monthly fixed date). Alternatively, displacement acquisition unit 110 may acquire the information on displacement of the ground surface from SAR 20 related to an instruction of the user.

Then, displacement acquisition unit 110 outputs the acquired information on the displacement of the ground surface to the position extraction unit 120.

The deterioration assessment device 10 may include a configuration (not illustrated) that analyzes the displacement of the ground surface using the measurement result (for example, SAR image) of the SAR 20. In this case, the deterioration assessment device 10 may acquire the observation result (for example, SAR image) from the SAR 20.

The position extraction unit 120 extracts the position at which the sensor information for the assessment of the deterioration is acquired based on the information on the displacement of the ground surface.

The position extraction unit 120 may extract not only individual positions but also a range including a plurality of positions as the position to be extracted. That is, the position extraction unit 120 may extract a position and/or a range for acquiring the sensor information for assessing the deterioration based on the information on the displacement of the ground surface. However, in the following description, in order to avoid complication of the description, the range including the plurality of positions is referred to as a "position".

Specifically, the position extraction unit 120 extracts a position at which the displacement of the ground surface satisfies a predetermined condition as the position at which the sensor information is acquired.

A condition used by the position extraction unit 120 to extract a position may be any condition. The user may assess the condition related to the structure which is the assessment target. Then, the user may set the assessed condition in the deterioration assessment device 10 before using the deterioration assessment device 10.

For example, it is assumed that a road surface where the ground surface sinks largely progresses in deterioration faster than other road surfaces. Therefore, the position extraction unit 120 may extract a position in a range (for example, a range in which the sinking amount exceeds a threshold) where ground sinking on the road surface is large. In this case, the condition is that "the sinking amount of the ground surface exceeds the threshold".

Furthermore, the position extraction unit 120 may add a predetermined position in addition to the position satisfying the condition as the extracted position.

For example, the sinking of the ground may spread to the surroundings. Therefore, the position extraction unit 120 may extract a predetermined range around the range in addition to the range in which the ground sinking is large. Specifically, the position extraction unit 120 may extract a position close to a position at which the ground sinking is large.

Alternatively, for example, a structure extending over a range where the ground sinking has occurred and a range where the ground sinking has not occurred is stressed at the boundary. As described above, the boundary of the ground sinking is a region where deterioration is likely to occur. Therefore, the position extraction unit 120 may extract a predetermined range in the periphery including the boundary in addition to the range where the ground sinking is large.

Alternatively, the position extraction unit 120 may select or add a position to be extracted using predetermined information.

The predetermined information may be information that affects the displacement of the ground surface. For example, the information that affects the displacement of the ground surface is underground construction or the like. The underground construction may change the ground of the structure on the ground surface. Therefore, the position extraction unit 120 may acquire information related to the structure which is the assessment target and underground construction around the structure from a predetermined organization (for example, a construction company of construction or a government agency that supervises construction), and select or add the position to be extracted with reference to the acquired information. Alternatively, the position extraction unit 120 may add a position from the underground construction to a predetermined range in consideration of safety.

The predetermined information may be information related to monitoring acquired from a predetermined device. For example, the information related to monitoring acquired from a predetermined device is information on past accidents such as depression and cracking of a water pipe, and/or complaints from neighboring residents. The position extraction unit 120 may select or add a position to be extracted with reference to the above information.

The predetermined information may be past deterioration assessment information. For example, the position extraction unit 120 may select or add a position to be extracted based on a result of deterioration assessment using sensor information acquired in the past. Specifically, it is a position at which it is assessed that deterioration is large as a result of past deterioration assessment, a position at which progress of deterioration is observed, or the like.

The predetermined information may be a past travel record or the like. For example, the position extraction unit 120 may select or add a position to be extracted based on a travel frequency traveling the position and acquiring the sensor data or an elapsed time from the last time traveling the position and acquiring the sensor data.

In FIG. 1, the deterioration assessment system 70 includes the information providing device 50 as an example of an acquisition source of such information. That is, the information providing device 50 provides the information referred to by the position extraction unit 120 in extraction of the position as described above. However, the information provided by the information providing device 50 is not limited to the above. The user may appropriately assess information to be acquired from the information providing device 50.

When the deterioration assessment device 10 does not use the predetermined information, the deterioration assessment system 70 may not include the information providing device 50.

The position extraction unit 120 may extract the position using the displacement of the ground surface at a plurality of times. For example, the deterioration assessment device 10 may store information on the displacement of the ground surface as a history in a storage unit (not illustrated). In this case, the position extraction unit 120 may extract the position using the ground surface displacement speed calculated using the history in addition to the displacement of the ground surface. Alternatively, the position extraction unit 120 may extract the position using the ground surface displacement speed calculated using the history. Alternatively, the position extraction unit 120 may extract a position at which the difference from the previous displacement is larger than a predetermined threshold.

Further, the position extraction unit 120 may give priority of acquiring the sensor information to the extracted position. For example, when extracting a range including a plurality of positions, the position extraction unit 120 may give a higher priority to a position having a larger ground sinking amount. Alternatively, the position extraction unit 120 may give a higher priority to a position having a higher ground surface displacement speed.

The position extraction unit 120 may give the priority of acquiring the sensor information to the position extracted using the predetermined information.

For example, the position extraction unit 120 may give priority based on information that affects the displacement of the ground surface. Specifically, the priority of a position where underground construction is being performed or a position around the location may be made higher.

For example, the position extraction unit 120 may give priority based on information related to monitoring acquired from a predetermined device. Specifically, the priority of information on an accident such as a past depression and cracking of a water pipe and/or a position at which a complaint or the like is received from a neighboring resident may be set to be high.

For example, the position extraction unit 120 may give priority based on past deterioration assessment information. Specifically, the priority of a position at which it has been assessed in the past that the deterioration is large or a position at which the progress of the deterioration has been observed may be set to be high.

For example, the position extraction unit 120 may give priority based on a past travel record. Specifically, the priority may be set high to a place where the travel frequency is low or a place where the elapsed time from the acquisition of the sensor data at the position in the past is long.

The position extraction unit 120 may give priority to a plurality of combinations of the above-described information.

Then, the position extraction unit 120 outputs the extracted position to the position output unit 130.

The position output unit 130 outputs the position extracted by the position extraction unit 120 to the terminal device 31.

The position output unit 130 may output the position to the terminal device 31 in association with other information. For example, when the deterioration assessment device 10 stores map data including the structure which is the assessment target in a storage unit (not illustrated), the position output unit 130 may output the position together with the stored map data.

Alternatively, the position output unit 130 may output the information including the priority.

The sensor information acquisition unit 140 acquires sensor information related to the position output by the position output unit 130 from the sensor information acquisition device 32. Then, the sensor information acquisition unit 140 outputs the acquired sensor information to the deterioration assessment unit 150.

The deterioration assessment unit 150 assesses the deterioration (for example, the deterioration position and the deterioration degree of the surface layer of the structure) of the structure by using the acquired sensor information.

In the deterioration assessment, the deterioration assessment unit 150 may use the information on the displacement of the ground surface acquired by the displacement acquisition unit 110 in addition to the sensor information.

For example, when there is no or small displacement of the ground surface, the pavement of the road is often cracked from the surface layer (hereinafter, referred to as a "first deterioration state").

However, when ground sinking occurs, the pavement of the road may have a crack not from the surface layer but from a portion (deep layer) close to the ground. In this case, the crack spreads from the deep layer to the surface layer. That is, when a crack occurs due to ground sinking, the crack spreads from the deep layer to the surface layer. Therefore, in this case, when the crack appears in the surface layer, the crack has already occurred in the entire pavement from the lower part to the upper part (hereinafter, referred to as a "second deterioration state"). Therefore, in the assessment of the deterioration of the structure, the deterioration assessment unit 150 may assess the deterioration that cannot be assessed only by the sensor information, by using the displacement of the ground surface including the structure which the assessment target in addition to the sensor information. For example, the deterioration assessment unit 150 may assess a distinction between the first deterioration state and the second deterioration state as a result of the assessment.

The deterioration assessment unit 150 may assess the deterioration by using sensor information in a plurality of times. For example, the deterioration assessment device 10 may store the sensor information as a history in a storage unit (not illustrated). In this case, the deterioration assessment unit 150 may assess the deterioration using the sensor information stored as the history (for example, using the deterioration speed).

Further, the deterioration assessment unit 150 may set a detailed inspection or repair priority for deterioration by using predetermined information, and include the set deterioration priority in the deterioration assessment result.

For example, the deterioration assessment unit 150 may set the priority to deterioration using the deterioration degree and the displacement of the ground surface. For example, the deterioration assessment unit 150 may set the priority to the assessment result of the deterioration degree of the same degree using the magnitude of the displacement of the ground surface.

Alternatively, the deterioration assessment unit 150 may set priority to deterioration with reference to information (for example, the frequency of the past acquisitions, the past assessment results, and/or the elapsed time since the last measurement) related to acquisition of sensor information in the past.

Further, the deterioration assessment unit 150 may set the priority to the deterioration using the deterioration speed calculated using the sensor information stored as the history and/or the ground surface displacement speed calculated using the displacement of the ground surface stored as the history. For example, the deterioration assessment unit 150 may set priority to deterioration using a weighted average value using weights set for the deterioration speed and the ground surface displacement speed.

Alternatively, the deterioration assessment unit 150 may set priority to deterioration with reference to information acquired from the information providing device 50. For example, the deterioration assessment unit 150 may set priority in consideration of a state of a past accident or a complaint of neighboring residents.

In this manner, the deterioration assessment unit 150 may set priority to deterioration based on predetermined information.

An assessment method in the deterioration assessment unit 150 may be any method. For example, the assessment in the deterioration assessment unit 150 may be assessed based on findings (for example, a record of past progress of deterioration of the same type of structure) regarding the structure. Alternatively, the deterioration assessment unit 150 may assess the deterioration using AI.

The deterioration assessment unit 150 may include, in the assessment result, any part or all of the information on the displacement of the ground surface acquired by the displacement acquisition unit 110, the position extracted by the position extraction unit 120, and the sensor information acquired by the sensor information acquisition unit 140.

Then, the deterioration assessment unit 150 outputs the assessment result to the assessment result output unit 160.

The assessment result output unit 160 outputs the assessment result in the deterioration assessment unit 150 to a predetermined device (for example, the display device 40).

The assessment result output unit 160 may output the assessment result in association with other information. For example, when the deterioration assessment device 10 stores map data including the structure which the assessment target in a storage unit (not illustrated), the assessment result output unit 160 may output the assessment result according to the stored map data.

In a case where any part or all of the information on the displacement of the ground surface, the position at which the sensor information is acquired, and the sensor information is included in the assessment result, the assessment result output unit 160 may select and output all or some of these pieces of information.

Alternatively, when the deterioration assessment unit 150 sets priority of detailed inspection or repair for deterioration, the assessment result output unit 160 may select the assessment result to be output based on the priority. For example, the assessment result output unit 160 may output the deterioration with priority in a predetermined range according to the instruction from the user.

The display device 40 may change the display using the priority of detailed inspection or repair.

As described above, the deterioration assessment device 10 extracts a position at which the displacement of the ground surface acquired from the SAR 20 satisfies a predetermined condition (for example, the ground sinking is equal to or more than the threshold) as a position at which sensor information for assessing deterioration is acquired. Then, the deterioration assessment device 10 outputs the extracted position to the terminal device 31.

That is, the deterioration assessment device 10 provides, as information for assessing the deterioration in more detail in the deterioration assessment of the structure, a position at which the sensor information for assessing the deterioration is acquired based on the information on the displacement of the ground surface.

Further, the deterioration assessment device 10 acquires the sensor information at the output position from the sensor information acquisition device 32. Then, the deterioration assessment device 10 assesses the deterioration of the position using the acquired sensor information.

As described above, the deterioration assessment device 10 can assess the detailed deterioration (for example, deterioration of a road surface) at the position (for example, a position at which ground sinking is large) where the displacement of the ground surface acquired from the SAR 20 satisfies the predetermined condition.

[Description of Operation]

Next, an operation of the deterioration assessment device 10 according to the first example embodiment will be described with reference to the drawings.

First, an operation of outputting a position at which sensor information is acquired in the deterioration assessment device 10 will be described.

FIG. 3 is a flowchart illustrating an example of an operation of outputting a position at which sensor information is acquired in the deterioration assessment device 10 according to the first example embodiment.

The displacement acquisition unit 110 acquires the information on a displacement of the ground surface from SAR 20 (Step S501).

The position extraction unit 120 extracts the position at which the sensor information is acquired based on the displacement of the ground surface (Step S502).

Then, the position output unit 130 outputs the extracted position to a predetermined device (for example, the terminal device 31) (Step S503). The position output unit 130 may store the extracted position.

The deterioration assessment device 10 outputs the position at which the sensor information is acquired based on the displacement of the ground surface based on the operation as illustrated in FIG. 3.

The terminal device 31 displays the output position.

An example of display on the terminal device 31 will be described with reference to the drawings.

Figure 4:
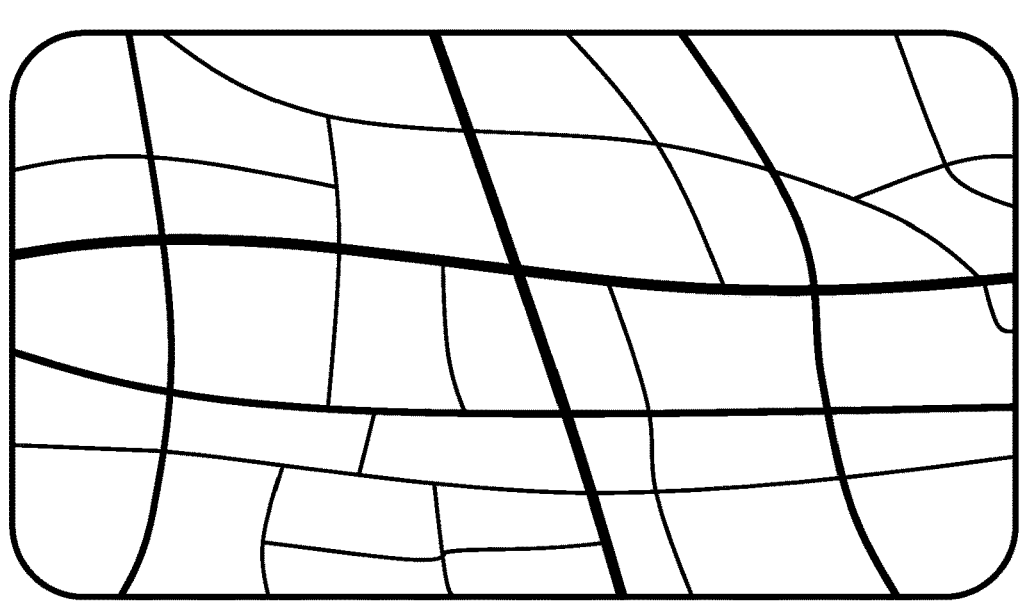
FIG. 4 is a diagram illustrating an example of a road used for description.

FIG. 4 illustrates an example of a road map used for description.

Each line in FIG. 4 indicates a road. A thickness of the road indicates a type of the road. For example, a thick road is a national highway, and a thin road is a prefectural road or a municipal road.

Figure 5:
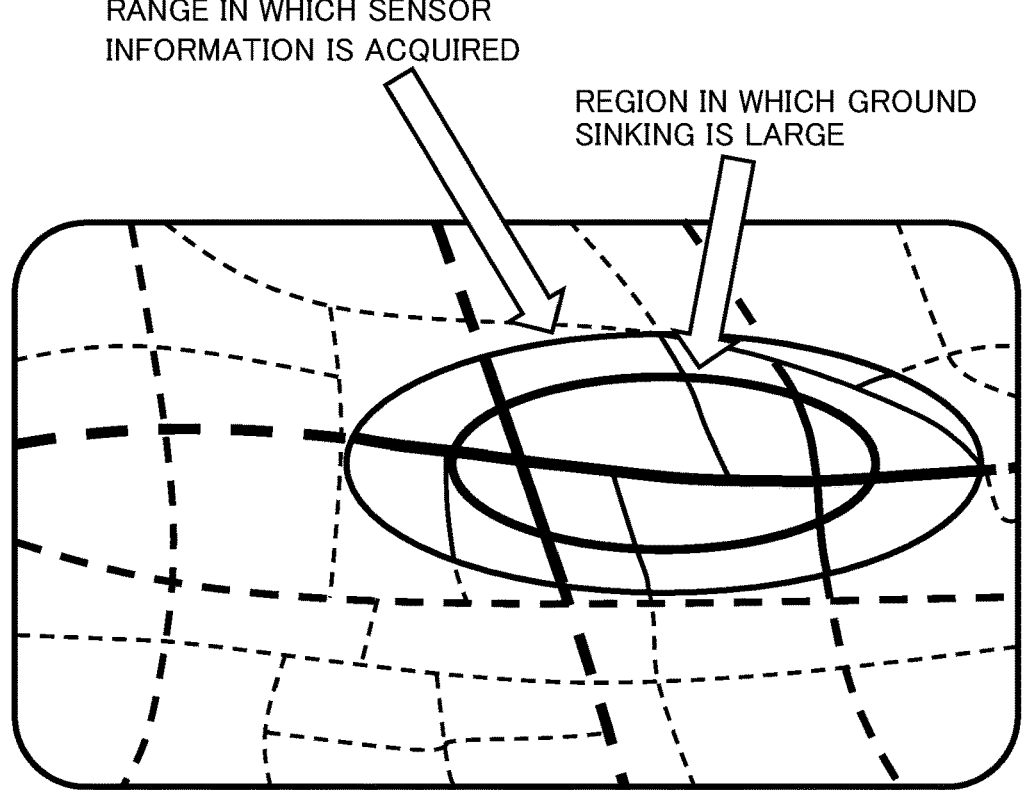
FIG. 5 is a diagram illustrating an example of display of the position at which the sensor information is acquired.

FIG. 5 is a diagram illustrating an example of the display of the extracted position.

In FIG. 5, the terminal device 31 indicates a road on which the sensor information is acquired by using a solid line. A broken line indicates a road that has not been extracted as the road for which the sensor information is acquired.

In FIG. 5, the terminal device 31 indicates an extracted range (range in which ground sinking is large) and a region (range in which sensor information is acquired) obtained by adding a predetermined peripheral region to the extracted range using an ellipse.

Next, an operation of assessing deterioration in the deterioration assessment device 10 will be described with reference to the drawings.

FIG. 6 is a flowchart illustrating an example of an operation of assessing the deterioration in the deterioration assessment device 10 according to the first example embodiment.

The sensor information acquisition unit 140 acquires sensor information from the sensor information acquisition device 32 (Step S511).

The deterioration assessment unit 150 assesses the deterioration of the structure using the sensor information (Step S512). The deterioration assessment unit 150 may use the information on the displacement of the ground surface in addition to the sensor information in the deterioration assessment.

The assessment result output unit 160 outputs the assessment result to a predetermined device (for example, the display device 40) (Step S513).

The deterioration assessment device 10 assesses and outputs the deterioration of the structure using the acquired sensor information based on the operation as illustrated in FIG. 6.

The display device 40 displays the assessment result of the deterioration assessment device 10.

Figure 7:
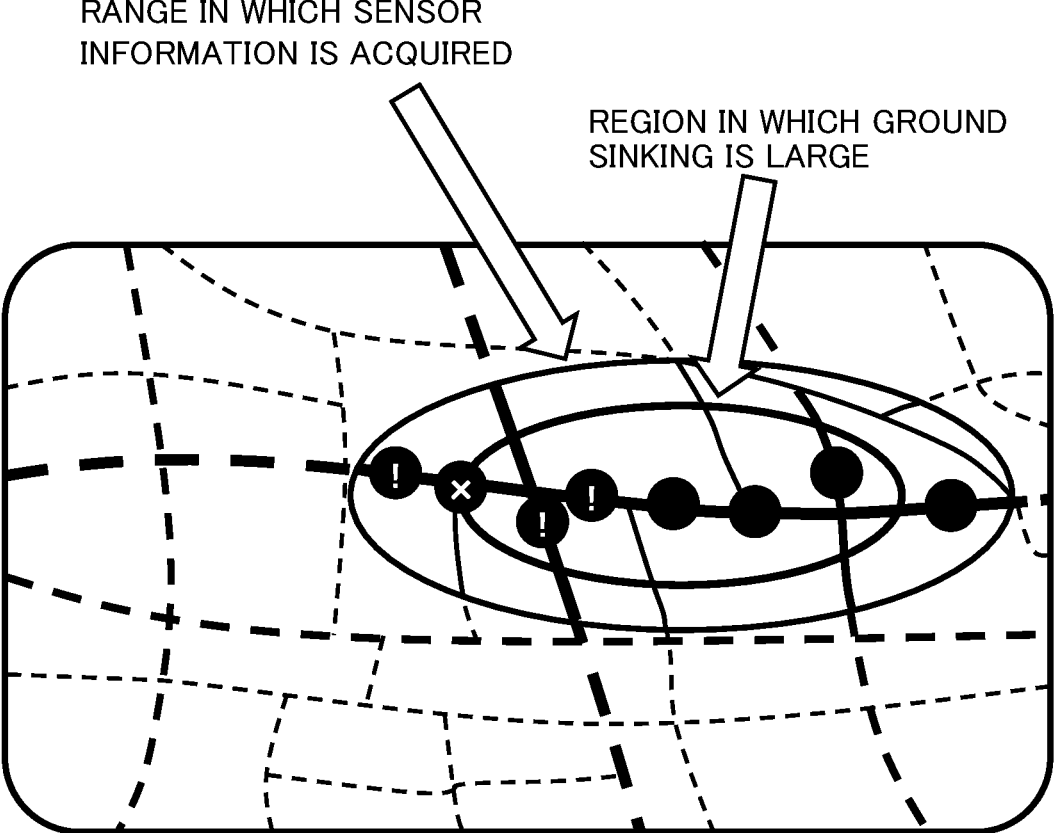
FIG. 7 is a diagram illustrating an example of the display of the deterioration.

FIG. 7 is a diagram illustrating an example of the display of the deterioration. FIG. 7 is an example of display of a deterioration assessment result using the sensor information in the range in which the sensor information illustrated in FIG. 5 is acquired.

In FIG. 7, the display device 40 indicates a position assessed to be deteriorated using a black circle. Further, the display device 40 uses highlight display (black circle with an exclamation mark) to indicate a position at which the deterioration degree is large. Further, the display device 40 indicates a position at which it is assessed that the deterioration degree is large at the boundary between the region where the displacement of the ground surface is large and the region where the displacement of the ground surface is small by using another highlight display (black circle with a cross mark).

As described above, the display device 40 may change the display related to the degree and type of deterioration.

The display device 40 may display details of the deteriorated part.

Figure 8:
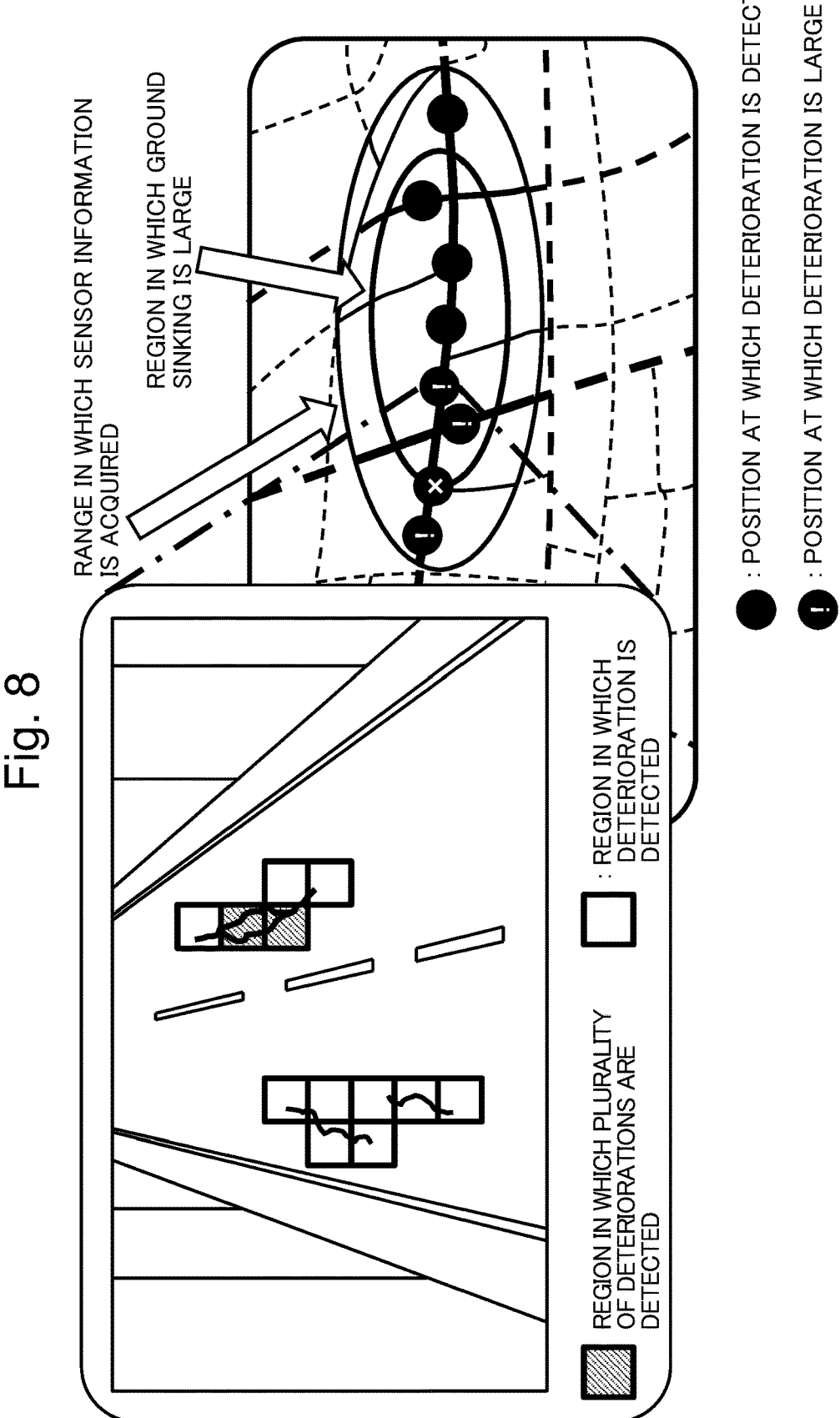
FIG. 8 is a view illustrating an example of detail display.

FIG. 8 is a diagram illustrating an example of the detailed display.

In FIG. 8, the display device 40 shows an image at a position designated by the user in FIG. 7, and indicates the position of the deterioration in the image using a rectangle.

The display device 40 may change the display related to the state (local deterioration state) of the deterioration in each rectangle. For example, in FIG. 8, the display device 40 uses highlight display (hatching) to indicate a region in which a plurality of deteriorations has been detected in a rectangle. The display device 40 may display the regions where different deterioration types (cracks, pot holes, or the like) are detected in different modes, or may display the regions in different modes according to the degree of progress of deterioration.

However, the display on the display device 40 is not limited to the above.

For example, in a case where the deterioration assessment device 10 includes the displacement of the ground surface in the assessment result, the display device 40 may display the displacement of the ground surface in addition to the deterioration.

In this case, the display device 40 may switch the display of the displacement of the ground surface according to the instruction of the user.

For example, there is a plurality of types (for example, the cumulative total (for example, a weekly cumulative total), the speed (for example, average speed in years), or the amount of change from the previous time (for example, a difference value of sinking)) for representation of the displacement of the ground surface. Therefore, the display device 40 may switch the displacement of the displayed ground surface based on the instruction from the user.

For example, the displacement of the ground surface generally varies continuously over a period of time. When checking such a change in a certain period, the user instructs display device 40 to display the average speed in a predetermined time range. In this case, display device 40 displays an average speed in a predetermined time range as the displacement of the ground surface.

However, for example, the accuracy of assessment may be improved by using the accumulation rather than the average speed for the depression caused by the underground construction or the displacement caused by the rise of the groundwater level due to heavy rain. Therefore, the user may instruct the display device 40 to display the accumulation as the assessment in the above case. In this case, the display device 40 displays the accumulation as the displacement of the ground surface.

As described above, display device 40 may switch the display of the displacement of the ground surface.

[Description of Effects]

Next, effects of the deterioration assessment device 10 according to the first example embodiment will be described.

The deterioration assessment device 10 according to the first example embodiment can provide information for assessing deterioration in more detail in the deterioration assessment of the structure.

The reason is as follows.

The deterioration assessment device 10 includes the displacement acquisition unit 110, the position extraction unit 120, and the position output unit 130. The displacement acquisition unit 110 acquires the information on the displacement of the ground surface. The position extraction unit 120 extracts the position at which the sensor information to be used for assessment of deterioration is acquired based on the information on the displacement of the ground surface. The position output unit 130 outputs the extracted position.

For example, it is estimated that deterioration of a road surface or the like progresses fast in a place where the ground sinking is large. That is, a portion where ground sinking is large is a portion where it is desirable to assess deterioration in detail.

The deterioration assessment device 10 outputs a position (for example, a position at which the ground sinks below a threshold.) at which the displacement of the ground surface acquired from the SAR 20 satisfies a predetermined condition to a predetermined device (for example, the terminal device 31) as the position at which the sensor information is acquired.

The spatial resolution of the displacement of the ground surface using SAR is about several meters to several tens of meters. Meanwhile, a spatial resolution of the deterioration assessment using the sensor information is about several centimeters to several meters. As described above, the spatial resolution of the deterioration assessment using the sensor information is higher than the spatial resolution of the displacement of the ground surface. Therefore, the deterioration assessment using the sensor information can assess the deterioration in more detail than the assessment using the displacement of the ground surface.

As described above, the deterioration assessment device 10 extracts and outputs a position (that is, the position at which the sensor information is acquired and the deterioration is assessed) that is better assessed in more detail using the displacement of the ground surface in the structure.

Therefore, the user can grasp the position at which it is better to acquire the sensor information in order to assess the deterioration in more detail using the information output from the deterioration assessment device 10. For example, the user may acquire the sensor information at the position and assess the deterioration.

The deterioration assessment device 10 further includes the sensor information acquisition unit 140, the deterioration assessment unit 150, and the assessment result output unit 160. The sensor information acquisition unit 140 acquires the sensor information at the output position. The deterioration assessment unit 150 assesses the deterioration by using the acquired sensor information. The assessment result output unit 160 outputs the result of the assessment.

The deterioration assessment device 10 acquires the sensor information related to the output position and assesses the deterioration at the position using the above configuration.

Therefore, the deterioration assessment device 10 can assess and output the deterioration at the position at which the displacement of the ground surface satisfies the predetermined condition in more detail using the sensor information.

For example, the user uses the sensor information acquisition device 32 to acquire the sensor information at the position output by the deterioration assessment device 10, and inputs the acquired sensor information to the deterioration assessment device 10. The deterioration assessment device 10 assesses the deterioration based on the acquired sensor information.

The user can grasp more detailed deterioration by using the deterioration assessment result output by the deterioration assessment device 10.

The deterioration assessment system 70 includes the deterioration assessment device 10, the SAR 20, and the terminal device 31. The SAR 20 outputs the information on the displacement of the ground surface to the deterioration assessment device 10. The deterioration assessment device 10 extracts and outputs the position at which the sensor information is acquired based on the information on the displacement of the ground surface acquired from the SAR 20. The terminal device 31 acquires the position from the deterioration assessment device 10 and outputs the position.

Using such a configuration, in the deterioration assessment of the structure, the deterioration assessment system 70 provides the user with the position for assessing the deterioration in more detail using the sensor information based on the displacement of the ground surface output by the SAR 20.

The deterioration assessment system 70 further includes the moving body 30, the sensor information acquisition device 32, and the display device 40.

The moving body 30 is mounted with or tows the sensor information acquisition device 32, and moves the position output to the terminal device 31. The sensor information acquisition device 32 acquires the sensor information at the position acquired from the deterioration assessment device 10, and outputs the sensor information to the deterioration assessment device 10. The deterioration assessment device 10 assesses the deterioration using the acquired sensor information, and outputs the assessment result to the display device 40. The display device 40 displays the assessment result acquired from the deterioration assessment device 10.

By using such a configuration, the deterioration assessment system 70 can provide the user with a more detailed assessment result than the assessment using the displacement of the ground surface.

The structure generally has a considerable size. For example, roads managed by local governments range from several hundred kilometers to several thousand kilometers. Therefore, monitoring the state of the road managed by each local government is a heavy burden.

Therefore, in order to reduce a load of the assessment, a device that assesses deterioration of a road surface using an image of a drive recorder has been used for monitoring a road.

However, even when the device that assesses the deterioration of the road using such a drive recorder is used, in a case where all roads are monitored, the man-hours are still considerably large. Therefore, a technique for selecting a position to be monitored is desired.

The deterioration assessment device 10 uses the analysis result of the SAR 20 to extract and output the position that should be assessed in more detail in the structure. That is, the position at which the sensor information output by the deterioration assessment device 10 is acquired is a position at which deterioration has occurred or where there is a high possibility that deterioration will occur in the near future. Therefore, the user can grasp the position to be preferentially monitored using the output of the deterioration assessment device 10.

As described above, the deterioration assessment device 10 can provide an effect of narrowing down the position at which the sensor information is acquired in a case where a device that assesses deterioration using sensor information such as a drive recorder is used.

The cycle of acquiring data used for analyzing the SAR 20 is about once every several weeks to several months. Meanwhile, the deterioration of the structure may greatly change in several days. For example, a shield method in which a tunnel is provided under the ground may travel several tens of meters a day. It is desirable to monitor such a depression due to construction at a cycle shorter than the acquisition cycle of the SAR 20 data.

For example, when a vehicle and a drive recorder are used as the moving body 30 and the sensor information acquisition device 32, the deterioration assessment system 70 can acquire the sensor information in units of one day or several days. Therefore, the deterioration assessment system 70 can obtain an effect of assessing deterioration in a cycle shorter than the acquisition cycle of the data of the SAR 20.

Second Example Embodiment

The deterioration assessment system 70 may use a device different from the deterioration assessment device 10 for assessing the deterioration of the structure. In this case, the deterioration assessment device 10 may not include the configuration related to the deterioration assessment.

FIG. 9 is a block diagram illustrating an example of a configuration of a deterioration assessment device 11 according to a second example embodiment.

The deterioration assessment device 11 includes a displacement acquisition unit 110, a position extraction unit 120, and a position output unit 130. The displacement acquisition unit 110 acquires the information on the displacement of the ground surface. The position extraction unit 120 extracts the position at which the sensor information to be used for assessment of deterioration is acquired based on the information on the displacement of the ground surface. The position output unit 130 outputs the extracted position.

Each component of the deterioration assessment device 11 operates similarly to each corresponding component in the deterioration assessment device 10.

The deterioration assessment device 11 configured as described above can obtain an effect similar to that of the deterioration assessment device 10. That is, the deterioration assessment device 11 can provide the information for assessing the deterioration in more detail in the deterioration assessment of the structure.

This is because each component of the deterioration assessment device 11 operates similarly to the similar configuration in the deterioration assessment device 10.

The deterioration assessment device 11 has a minimum configuration of the deterioration assessment device 10. (System)

FIG. 10 is a block diagram illustrating an example of a configuration of a deterioration assessment system 71 including the deterioration assessment device 11 according to the second example embodiment.

The deterioration assessment system 71 includes the deterioration assessment device 11, a SAR 20, and a terminal device 31. The SAR 20 outputs information on the displacement of the ground surface to the deterioration assessment device 11. The deterioration assessment device 11 extracts and outputs a position at which the sensor information is acquired based on the information on the displacement of the ground surface acquired from the SAR 20. The terminal device 31 acquires a position from the deterioration assessment device 11 and outputs the position.

The deterioration assessment system 71 configured as described above can obtain an effect similar to that of the deterioration assessment system 70. That is, the deterioration assessment system 71 can provide information for assessing the deterioration in the structure in more detail.

This is because each component of the deterioration assessment system 71 operates similarly to the similar configuration in the deterioration assessment system 70.

The deterioration assessment system 71 has a minimum configuration of the deterioration assessment system 70.

<Hardware Configuration>

Next, a hardware configuration of the deterioration assessment devices 10 and 11 will be described using the deterioration assessment device 10.

Each component of the deterioration assessment device 10 may be configured by a hardware circuit.

Alternatively, in the deterioration assessment device 10, each component may be configured using a plurality of devices connected via a network. For example, the deterioration assessment device 10 may be configured using cloud computing.

Alternatively, in the deterioration assessment device 10, the plurality of components may be configured by one piece of hardware.

Alternatively, the deterioration assessment device 10 may be achieved as a computer device including a central processing unit (CPU), a read only memory (ROM), and a random access memory (RAM). The deterioration assessment device 10 may be achieved as a computer device including a network interface circuit (NIC) in addition to the above configuration.

Figure 11:
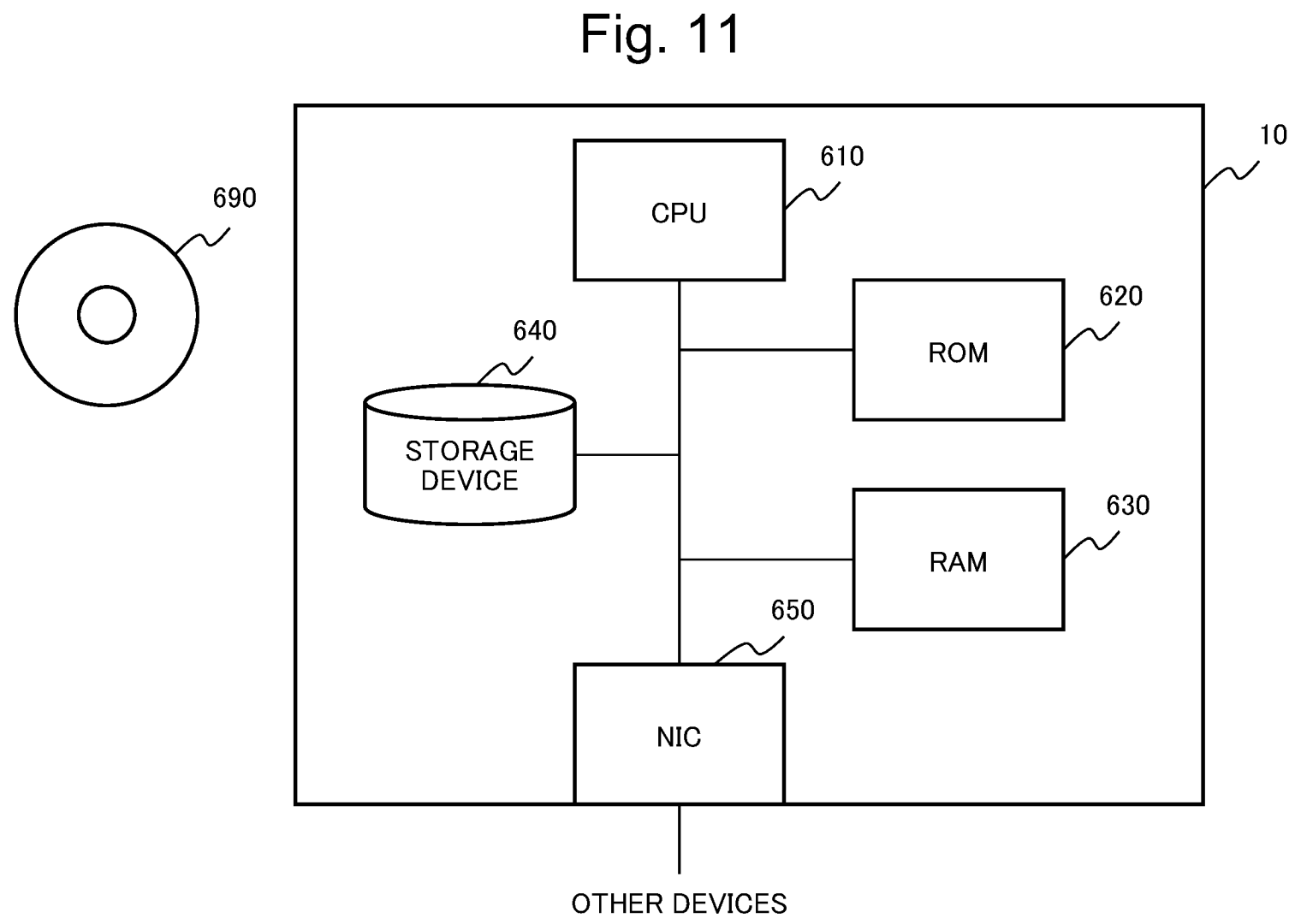

FIG. 11 is a block diagram illustrating an example of a hardware configuration of the deterioration assessment device 10.

The deterioration assessment device 10 includes a CPU 610, a ROM 620, a RAM 630, a storage device 640, and an NIC 650, and constitutes a computer device.

The CPU 610 reads a program from the ROM 620 and/or the storage device 640. Then, the CPU 610 controls the RAM 630, the storage device 640, the IOC 650, and the NIC 650 based on the read program. Then, the computer including the CPU 610 controls these configurations, and achieves functions as the displacement acquisition unit 110, the position extraction unit 120, the position output unit 130, the sensor information acquisition unit 140, the deterioration assessment unit 150, and the assessment result output unit 160 illustrated in FIG. 1.

When achieving each function, the CPU 610 may use the RAM 630 or the storage device 640 as a temporary storage medium of the program.

The CPU 610 may read the program included in the recording medium 690 storing the program in a computer readable manner using a recording medium reading device (not illustrated). Alternatively, the CPU 610 may receive a program from an external device (not illustrated) via the NIC 650, store the program in the RAM 630 or the storage device 640, and operate based on the stored program.

The ROM 620 stores programs executed by the CPU 610 and fixed data. The ROM 620 is, for example, a programmable ROM (P-ROM) or a flash ROM.

The RAM 630 temporarily stores programs and data executed by the CPU 610. The RAM 630 is, for example, a dynamic-RAM (D-RAM).

The storage device 640 stores data and programs to be stored for a long time by the deterioration assessment device 10. The storage device 640 may operate as a temporary storage device of the CPU 610. The storage device 640 is, for example, a hard disk device, a magneto-optical disk device, a solid state drive (SSD), or a disk array device.

The ROM 620 and the storage device 640 are non-transitory recording media. Meanwhile, the RAM 630 is a transitory recording medium. The CPU 610 is operable based on a program stored in the ROM 620, the storage device 640, or the RAM 630. That is, the CPU 610 can operate using a non-transitory recording medium or a transitory recording medium.

The NIC 650 relays exchange of data with other devices (SAR 20, terminal device 31, sensor information acquisition device 32, display device 40, and information providing device 50) via a network. The NIC 650 is, for example, a local area network (LAN) card. Furthermore, the NIC 650 is not limited to wired communication, and may be wireless communication.

The deterioration assessment device 10 configured as described above can obtain effects similar to those of the deterioration assessment device 10 of FIG. 1.

This is because the CPU 610 of the deterioration assessment device illustrated in FIG. 11 can achieve the same function as that of the deterioration assessment device 10 of FIG. 1 based on the program.

Some or all of the above embodiments may be described as the following Supplementary Notes, but are not limited to the following.

Supplementary Note 1

A deterioration assessment device including:

a memory; and at least one processor coupled to the memory the processor performing operations, the operations including:

acquiring information on displacement of a ground surface;

extracting a position at which sensor information used for assessment of deterioration is acquired based on the information on the displacement of the ground surface; and outputting the extracted position.

Supplementary Note 2

The deterioration assessment device according to Supplementary Note 1, wherein a spatial resolution of the assessment of the deterioration using the sensor information is higher than a spatial resolution of the displacement of the ground surface.

Supplementary Note 3

The deterioration assessment device according to Supplementary Note 1 or 2, wherein the information on the displacement of the ground surface includes a sinking amount of a ground, and the position at which the sensor information is acquired includes a position at which the sinking amount of the ground exceeds a threshold.

Supplementary Note 4

The deterioration assessment device according to any one of Supplementary Notes 1 to 3, wherein the information on the displacement of the ground surface includes a ground surface displacement speed calculated using a history of the displacement of the ground surface, and the position at which the sensor information is acquired includes a position at which the ground surface displacement speed exceeds a threshold.

Supplementary Note 5

The deterioration assessment device according to any one of Supplementary Notes 1 to 4, wherein
the position at which the sensor information is acquired further includes a position close to a position at which a sinking amount of a ground or a ground surface displacement speed exceeds a threshold.

Supplementary Note 6

The deterioration assessment device according to any one of Supplementary Notes 1 to 5, wherein the operations further include:
extracting a position at which the sensor information is acquired based on predetermined information in addition to the information on the displacement of the ground surface.

Supplementary Note 7

The deterioration assessment device according to Supplementary Note 6, wherein
the predetermined information includes at least one of information that affects the displacement of the ground surface, information related to monitoring, past deterioration information, and a travel record.

Supplementary Note 8

The deterioration assessment device according to any one of Supplementary Notes 1 to 7, wherein the operations further include:
giving priority to the position at which the sensor information is acquired based on at least one of the information on the displacement of the ground surface and predetermined information.

Supplementary Note 9

The deterioration assessment device according to any one of Supplementary Notes 1 to 8, wherein the operations further include:
acquiring the sensor information at the output position;
assessing the deterioration by using the acquired sensor information; and
outputting a result of the assessment.

Supplementary Note 10

The deterioration assessment device according to Supplementary Note 9, wherein the operations further include:
assessing the deterioration by using the information on the displacement of the ground surface.

Supplementary Note 11

The deterioration assessment device according to Supplementary Note 9 or 10, wherein the operations further include:
setting priority of detailed inspection or repair for the deterioration based on predetermined information.

Supplementary Note 12

A deterioration assessment system including:
the deterioration assessment device according to any one of Supplementary Notes 1 to 8;
a synthetic aperture radar configured to output the information on the displacement of the ground surface to the deterioration assessment device; and
a terminal device configured to acquire the position from the deterioration assessment device and output the position.

Supplementary Note 13

A deterioration assessment system including:
the deterioration assessment device according to Supplementary Note 9 or 10;
a synthetic aperture radar configured to output the information on the displacement of the ground surface to the deterioration assessment device;
a terminal device configured to acquire a position from the deterioration assessment device and output the position;
a sensor information acquisition device configured to sensor information at the position output by the terminal device and output the sensor information to the deterioration assessment device; and
a display device configured to acquire an assessment result from the deterioration assessment device and output the assessment result.

Supplementary Note 14

The deterioration assessment system according to Supplementary Note 13, wherein
the display device outputs a route from a current position or a predetermined position to the position acquired from the deterioration assessment device.

Supplementary Note 15

A deterioration assessment system including:
the deterioration assessment device according to any one of Supplementary Notes 6 to 8 and 11;
a synthetic aperture radar configured to output the information on the displacement of the ground surface to the deterioration assessment device;
a terminal device configured to acquire a position from the deterioration assessment device and output the position;
a sensor information acquisition device configured to sensor information at the position output by the terminal device and output the sensor information to the deterioration assessment device;
a display device configured to acquire an assessment result from the deterioration assessment device and output the assessment result; and
an information providing device configured to output predetermined information to the deterioration assessment device.

Supplementary Note 16

A deterioration assessment method comprising:
acquiring information on displacement of a ground sur-
face;
extracting a position at which sensor information used for
assessment of deterioration is acquired based on the
information on the displacement of the ground surface;
and
outputting the extracted position.

Supplementary Note 17

The deterioration assessment method according to
Supplementary Note 16, wherein
a spatial resolution of the assessment of the deterioration
using the sensor information is higher than a spatial
resolution of the displacement of the ground surface.

Supplementary Note 18

The deterioration assessment method according to
Supplementary Note 16 or 17, wherein
the information on the displacement of the ground surface
includes a sinking amount of a ground, and
the position at which the sensor information is acquired
includes a position at which the sinking amount of the
ground exceeds a threshold.

Supplementary Note 19

The deterioration assessment method according to any
one of Supplementary Notes 16 to 18, wherein
the information on the displacement of the ground surface
includes a ground surface displacement speed calcu-
lated using a history of the displacement of the ground
surface, and
the position at which the sensor information is acquired
includes a position at which the ground surface dis-
placement speed exceeds a threshold.

Supplementary Note 20

The deterioration assessment method according to any
one of Supplementary Notes 16 to 19, wherein
the position at which the sensor information is acquired
further includes a position close to a position at which
a sinking amount of a ground or a ground surface
displacement speed exceeds a threshold.

Supplementary Note 21

The deterioration assessment method according to any
one of Supplementary Notes 16 to 20, further including:
extracting a position at which the sensor information is
acquired based on predetermined information in addi-
tion to the information on the displacement of the
ground surface.

Supplementary Note 22

The deterioration assessment method according to
Supplementary Note 21, wherein
the predetermined information includes at least one of
information that affects the displacement of the ground surface, information related to monitoring, past dete-
rioration information, and a travel record.

Supplementary Note 23

The deterioration assessment method according to any
one of Supplementary Notes 16 to 22, further including:
giving priority to the position at which the sensor infor-
mation is acquired based on at least one of the infor-
mation on the displacement of the ground surface and
predetermined information.

Supplementary Note 24

The deterioration assessment method according to any
one of Supplementary Notes 16 to 23, further including:
acquiring the sensor information at the output position;
assessing the deterioration by using the acquired sensor
information; and
outputting a result of the assessment.

Supplementary Note 25

The deterioration assessment method according to
Supplementary Note 24, further including:
assessing the deterioration by using the information on the
displacement of the ground surface.

Supplementary Note 26

The deterioration assessment method according to
Supplementary Note 24 or 25, further including:
setting priority to the deterioration based on predeter-
mined information.

Supplementary Note 27

A deterioration assessment method including:
executing the method according to any one of Supple-
mentary Notes 16 to 23 by a deterioration assessment
device;
outputting the information on the displacement of the
ground surface to the deterioration assessment device
by a synthetic aperture radar; and
acquiring the position from the deterioration assessment
device and outputting the acquired position by a ter-
minal device.

Supplementary Note 28

A deterioration assessment method including:
executing the method according to Supplementary Note
24 or 25 by a deterioration assessment device;
outputting the information on the displacement of the
ground surface to the deterioration assessment device
by a synthetic aperture radar;
acquiring the position from the deterioration assessment
device and outputting the position by a terminal device;
acquiring the sensor information at the position at which
the terminal device outputs and outputting the sensor
information to the deterioration assessment device by a
sensor information acquisition device; and
acquiring the result of the assessment from the deterio-
ration assessment device and outputting the result by a
display device.

Supplementary Note 29

The deterioration assessment method according to Supplementary Note 28, further including:
  outputting a route from a current position or a predetermined position to the position acquired from the deterioration assessment device by the display device.

Supplementary Note 30

A deterioration assessment method including:
  executing the method according to any one of Supplementary Notes 16 to 23 and 26 by a deterioration assessment device;
  outputting the information on the displacement of the ground surface to the deterioration assessment device by a synthetic aperture radar;
  acquiring the position from the deterioration assessment device and outputting the position by a terminal device;
  acquiring the sensor information at the position at which the terminal device outputs and outputting the sensor information to the deterioration assessment device by a sensor information acquisition device;
  acquiring the result of the assessment from the deterioration assessment device and outputting the result by a display device; and
  outputting predetermined information to the deterioration assessment device by an information providing device.

Supplementary Note 31

A non-transitory computer-readable recording medium embodying a program for causing a computer to perform a method, the method includes:
  acquiring information on displacement of a ground surface;
  extracting a position at which sensor information used for assessment of deterioration is acquired based on the information on the displacement of the ground surface; and
  outputting the extracted position.

Supplementary Note 32

The recording medium according to Supplementary Note 31, wherein
  a spatial resolution of the assessment of the deterioration using the sensor information is higher than a spatial resolution of the displacement of the ground surface.

Supplementary Note 33

The recording medium according to Supplementary Note 31 or 32, wherein
  the information on the displacement of the ground surface includes a sinking amount of a ground, and
  the position at which the sensor information is acquired includes a position at which the sinking amount of the ground exceeds a threshold.

Supplementary Note 34

The recording medium according to any one of Supplementary Notes 31 to 33, wherein
  the information on the displacement of the ground surface includes a ground surface displacement speed calculated using a history of the displacement of the ground surface, and the position at which the sensor information is acquired includes a position at which the ground surface displacement speed exceeds a threshold.

Supplementary Note 35

The recording medium according to any one of Supplementary Notes 31 to 34, wherein
  the position at which the sensor information is acquired further includes a position close to a position at which a sinking amount of a ground or a ground surface displacement speed exceeds a threshold.

Supplementary Note 36

The recording medium according to any one of Supplementary Notes 31 to 35, wherein the recording medium embodies a program for causing a computer to perform a method, the method including:
  extracting a position at which the sensor information is acquired based on predetermined information in addition to the information on the displacement of the ground surface.

Supplementary Note 37

The recording medium according to Supplementary Note 36, wherein
  the predetermined information includes at least one of information that affects the displacement of the ground surface, information related to monitoring, past deterioration information, and a travel record.

Supplementary Note 38

The recording medium according to any one of Supplementary Notes 31 to 37, wherein the recording medium embodies a program for causing a computer to perform a method, the method including:
  giving priority to the position at which the sensor information is acquired based on at least one of the information on the displacement of the ground surface and predetermined information.

Supplementary Note 39

The recording medium according to any one of Supplementary Notes 31 to 38, wherein the recording medium embodies a program for causing a computer to perform a method, the method including:
  acquiring the sensor information at the output position;
  assessing the deterioration by using the acquired sensor information; and
  outputting a result of the assessment.

Supplementary Note 40

The recording medium according to Supplementary Note 39, wherein the recording medium embodies a program for causing a computer to perform a method, the method including:
  assessing the deterioration by using the information on the displacement of the ground surface.

Supplementary Note 41

The recording medium according to Supplementary Note 39 or 40, wherein the recording medium embodies a program for causing a computer to perform a method, the method including:

setting priority to the deterioration based on predetermined information.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST 10 deterioration assessment device
11 deterioration assessment device
20 SAR
30 moving body
31 terminal device
32 sensor information acquisition device
40 display device
50 Information providing device
70 deterioration assessment system
71 deterioration assessment system
110 displacement acquisition unit
120 position extraction unit
130 position output unit
140 sensor information acquisition unit
150 deterioration assessment unit
160 assessment result output unit
610 CPU
620 ROM
630 RAM
640 storage device
650 NIC
690 recording medium
810 computer
820 SAR system
830 vehicle
831 tablet
832 drive recorder
840 display system
880 network

What is claimed is:

1. A deterioration assessment device comprising:
a memory storing instructions; and
at least one processor coupled to the memory and configured to execute the instructions to perform operations comprising:
acquiring information on displacement of a ground surface using a synthetic aperture radar;
extracting a position at which sensor information used for assessment of deterioration is acquired based on the information on the displacement of the ground surface; and
outputting the extracted position, wherein
the sensor information is acquired at the extracted position from a sensor information acquisition device that is mounted on or towed by a moving body.

2. The deterioration assessment device according to claim 1, wherein
a spatial resolution of the assessment of the deterioration using the sensor information is higher than a spatial resolution of the displacement of the ground surface.

3. The deterioration assessment device according to claim 1, wherein
the information on the displacement of the ground surface includes a sinking amount of a ground, and the position at which the sensor information is acquired includes a position at which a sinking amount of a ground exceeds a threshold.

4. The deterioration assessment device according to claim 1, wherein
the information on the displacement of the ground surface includes a ground surface displacement speed calculated using a history of a displacement of a ground surface, and
the position at which the sensor information is acquired includes a position at which a ground surface displacement speed exceeds a threshold.

5. The deterioration assessment device according to claim 1, wherein
the position at which the sensor information is acquired further includes a position close to a position at which a sinking amount of a ground or a ground surface displacement speed exceeds a threshold.

6. The deterioration assessment device according to claim 1, wherein the operations further comprise:
extracting a position at which the sensor information is acquired based on predetermined information in addition to the information on the displacement of the ground surface.

7. The deterioration assessment device according to claim 6, wherein
predetermined information includes at least one of information that affects a displacement of a ground surface, information related to monitoring, past deterioration information, and a travel record.

8. The deterioration assessment device according to claim 1, wherein the operations further comprise:
giving priority to the position at which the sensor information is acquired based on at least one of the information on the displacement of the ground surface and predetermined information.

9. The deterioration assessment device according to claim 1, wherein the operations further comprise:
acquiring the sensor information at extracted position;
assessing the deterioration by using the acquired sensor information; and
outputting a result of assessment.

10. The deterioration assessment device according to claim 9, wherein the operations further comprise:
assessing the deterioration by using the information on the displacement of the ground surface.

11. The deterioration assessment device according to claim 9, wherein the operations further comprise:
setting priority of detailed inspection or repair for the deterioration based on predetermined information.

12. A deterioration assessment method performed by a computer and comprising:
acquiring information on displacement of a ground surface;
extracting a position at which sensor information used for assessment of deterioration is acquired based on the information on the displacement of the ground surface; and
outputting the extracted position, wherein
the sensor information is acquired at the extracted position from a sensor information acquisition device that is mounted on or towed by a moving body.

13. A non-transitory computer-readable recording medium storing a program executable by a computer to perform a method comprising:
acquiring information on displacement of a ground surface;

extracting a position at which sensor information used for assessment of deterioration is acquired based on the information on the displacement of the ground surface; and outputting the extracted position, wherein the sensor information is acquired at the extracted position from a sensor information acquisition device that is mounted on or towed by a moving body.

14. The deterioration assessment device according to claim 1, wherein the deterioration is deterioration in a portion that is an assessment target in a structure.

15. The deterioration assessment device according to claim 14, wherein the structure is at least one of a road, a bridge, a platform, an embankment, a pier, a seawall, or a runway.

\* \* \* \* \*